(12) United States Patent
Handte et al.

(10) Patent No.: US 12,289,162 B2
(45) Date of Patent: Apr. 29, 2025

(54) COMMUNICATION DEVICES AND METHODS

(71) Applicant: Sony Group Corporation, Tokyo (JP)

(72) Inventors: Thomas Handte, Stuttgart (DE); Dana Ciochina, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 363 days.

(21) Appl. No.: 17/788,301

(22) PCT Filed: Dec. 16, 2020

(86) PCT No.: PCT/EP2020/086449
§ 371 (c)(1),
(2) Date: Jun. 23, 2022

(87) PCT Pub. No.: WO2021/136662
PCT Pub. Date: Jul. 8, 2021

(65) Prior Publication Data
US 2023/0022597 A1     Jan. 26, 2023

(30) Foreign Application Priority Data
Dec. 30, 2019 (EP) .................................. 19220056

(51) Int. Cl.
*H04L 1/00* (2006.01)
(52) U.S. Cl.
CPC .................. *H04L 1/0008* (2013.01)
(58) Field of Classification Search
CPC .................................................. H04L 1/0008
See application file for complete search history.

(56) References Cited

U.S. PATENT DOCUMENTS

2009/0024756 A1   1/2009   Spalla
2010/0100795 A1*   4/2010   Yuan ..................... H04L 1/0057
                                                                   714/776

(Continued)

FOREIGN PATENT DOCUMENTS

CN       102187634 A     9/2011
CN       106685885 A     5/2017

(Continued)

OTHER PUBLICATIONS

International Search Report and Written Opinion mailed on Mar. 3, 2021, received for PCT Application PCT/EP2020/086449, filed on Dec. 16, 2020, 12 pages.

(Continued)

*Primary Examiner* — Michael Thier
*Assistant Examiner* — Tracy Lauren Colbert
(74) *Attorney, Agent, or Firm* — XSENSUS LLP

(57) ABSTRACT

Communication device for transmitting data to another communication device, the communication device comprising circuitry configured to obtain a truncation notification indicating that an ongoing transmission of a data unit is to be truncated; in response to the truncation notification, determine, based on the number of unprocessed modulation input bits of the data unit, a remaining bit length of a modulation input block, and perform padding to add a number of modulation padding bits corresponding to the determined remaining bit length of a modulation input block to the unprocessed modulation input bits to obtain a complete modulation input block; modulate the complete modulation input block to obtain a modulation output block; and transmit a transmit data stream containing the obtained modulation output block.

19 Claims, 25 Drawing Sheets

(56) References Cited

U.S. PATENT DOCUMENTS

| | | | |
|---|---|---|---|
| 2011/0134816 A1 | 6/2011 | Liu et al. | |
| 2012/0243629 A1* | 9/2012 | van Houtum | H04L 27/26524 |
| | | | 375/260 |
| 2016/0211998 A1 | 7/2016 | Sun | |
| 2016/0261283 A1* | 9/2016 | Myung | H04L 1/0067 |
| 2017/0222871 A1* | 8/2017 | Yu | H04L 47/365 |
| 2019/0199478 A1* | 6/2019 | Yun | H04L 1/0625 |
| 2019/0349109 A1* | 11/2019 | Qu | H04J 13/00 |
| 2020/0220763 A1* | 7/2020 | Montorsi | H04L 27/3405 |
| 2021/0084654 A1* | 3/2021 | Yang | H04L 69/324 |

FOREIGN PATENT DOCUMENTS

| | | |
|---|---|---|
| CN | 108347399 A | 7/2018 |
| WO | WO-2017132069 A1 | 8/2017 |

OTHER PUBLICATIONS

Zhang et al., "HE PHY Padding and Packet Extension", doc.: IEEE 802.11-15/0810, Sep. 12, 2015, pp. 1-46.

IEEE, "Part 11: Wireless LAN Medium Access Control (MAC) and Physical Layer (PHY) Specifications", IEEE Std 802.11™-2016, IEEE Computer Society, Dec. 7, 2016, pp. 1-3530.

* cited by examiner

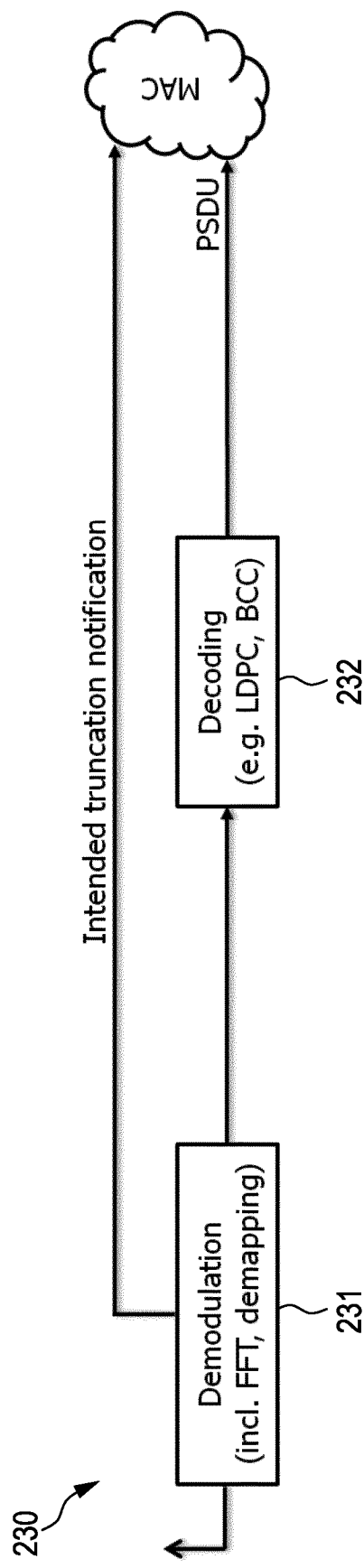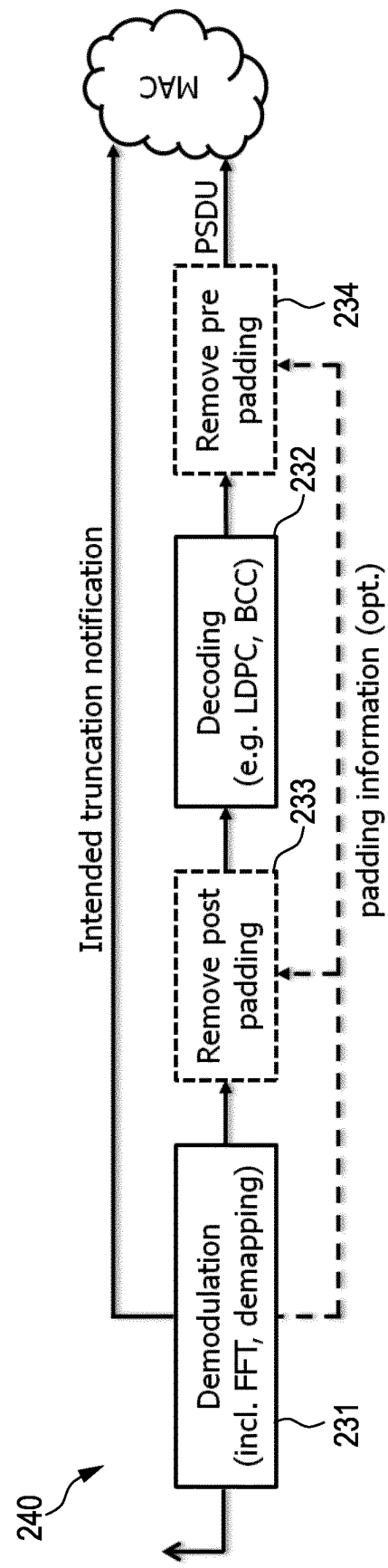
Fig. 24
Fig. 25

COMMUNICATION DEVICES AND METHODS

CROSS-REFERENCE TO RELATED APPLICATIONS

The present application is based on PCT filing PCT/EP2020/086449, filed Dec. 16, 2020, which claims priority to EP 19220056.6, filed on Dec. 30, 2019, the entire contents of each are incorporated herein by reference.

BACKGROUND

Field of the Disclosure

The present disclosure relates to a communication device and method for transmitting data to another communication device and to a communication device and method for receiving data from another communication device.

Description of Related Art

WLAN, as defined in IEEE 802.11-2016, implements packet-based data transmission. When one or more input data packets or MSDUs (MAC layer service data unit) are present and the wireless channel is free, these MSDUs are processed by the MAC layer to one or more MPDUs (MAC layer protocol data unit) and by the PHY layer, before they are transmitted to one or more peer WLAN communication device as PPDUs (physical layer protocol data unit).

Certain restrictions apply to the length of such a PPDU, measured on the wireless channel. This restriction limits the maximum length or transmit time to a range from 2 ms to 10 ms (sometimes 20 ms) depending on the considered standard. The transmit time is determined and fixed at the beginning of a PPDU transmission. A long transmit time is favorable for high efficiency in communications as the overhead for gaining channel access, preamble transmission, and/or control frame transmission gets negligible.

In the context of low-latency communications, an access point (AP) or a station (STA) may want to transmit both non-latency sensitive and latency sensitive data packets. Often, the arrival of a latency sensitive packet is random, unknown, and unpredictable. Thus, it may happen that a transmission of one or more non-latency sensitive MSDUs has just started when one or more latency sensitive MSDUs arrive. According to the current WLAN behavior, the ongoing PPDU transmission is required to finish before a new PPDU transmission that conveys the latency sensitive MSDUs can be initiated. Thus, the latency sensitive MSDUs may need to wait unacceptably long for their transmission.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to enable dealing with situations where a data transmission is ongoing when e.g. a latency sensitive data unit arrives in an improved manner.

According to an aspect there is provided a communication device for transmitting data to another communication device, the communication device comprising circuitry configured to:

obtain a truncation notification indicating that an ongoing transmission of a data unit is to be truncated;
in response to the truncation notification,
determine, based on the number of unprocessed modulation input bits of the data unit, a remaining bit length of a modulation input block, and
perform padding to add a number of modulation padding bits corresponding to the determined remaining bit length of a modulation input block to the unprocessed modulation input bits to obtain a complete modulation input block;
modulate the complete modulation input block to obtain a modulation output block; and
transmit a transmit data stream containing the obtained modulation output block.

According to a further aspect there is provided another communication device for receiving data from another communication device, the communication device comprising circuitry configured to:

receive a receive data stream containing multiple modulation output blocks;
determine if truncation has been applied by the other communication device according to which an ongoing transmission of a data unit has been truncated; and
in case truncation has been applied by the other communication device,
demodulate and decode the received modulation output blocks, and
indicate for subsequent processing by the communication device that an intended truncation was the reason for the truncation.

According to still further aspects, corresponding methods, a computer program comprising program means for causing a computer to carry out the steps of any one of the methods disclosed herein, when said computer program is carried out on a computer, as well as a non-transitory computer-readable recording medium that stores therein a computer program product, which, when executed by a processor, causes any one of the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is to truncate or interrupt an ongoing transmission of one or more data units, particularly if a more urgent or latency sensitive data unit arrives for transmission, in a manner that the receiver is still able to process a received data unit, even if it is not complete. For this purpose, a number of modulation padding bits is determined and added to the unprocessed modulation input bits to obtain a complete modulation input block for subsequent modulation. This enables that other data units having e.g. a higher priority or urgency can be transmitted without a large delay.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 24 shows a simplified schematic diagram of the communication device shown in

FIG. 21.

FIG. 25 shows a simplified schematic diagram of the communication device shown in

FIG. 22.

FIG. 26 shows a simplified schematic diagram of the communication device shown in

FIG. 23.

DETAILED DESCRIPTION OF THE EMBODIMENTS

Figure 1:
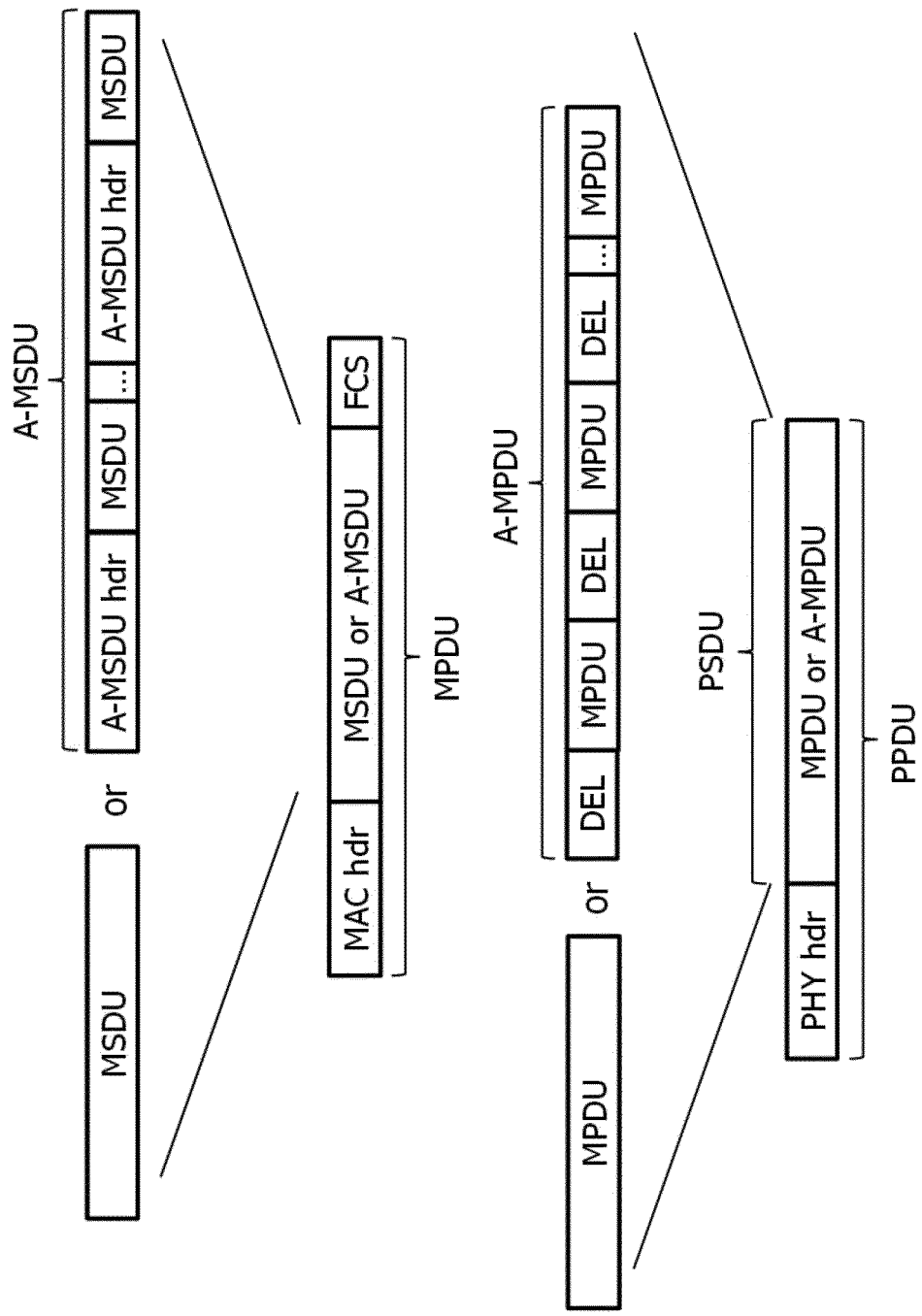
FIG. 1 shows a diagram illustrating the relation and construction of data units in conventional WLAN.

Referring now to the drawings, wherein like reference numerals designate identical or corresponding parts throughout the several views, FIG. 1 shows the generally known relation and construction of data units in WLAN, in particular of MSDUs or A-MSDUs (aggregated MSDUs), MPDUs, PSDUs (physical layer service data units) and PPDUs.

According to the present disclosure, a PPDU transmission, i.e. a transmission of a data unit, is to be truncated (i.e., shall be truncated or interrupted) without losing data that has already been transmitted. It can thus be considered as a receiver friendly truncation of an ongoing PPDU transmission.

Figure 2:
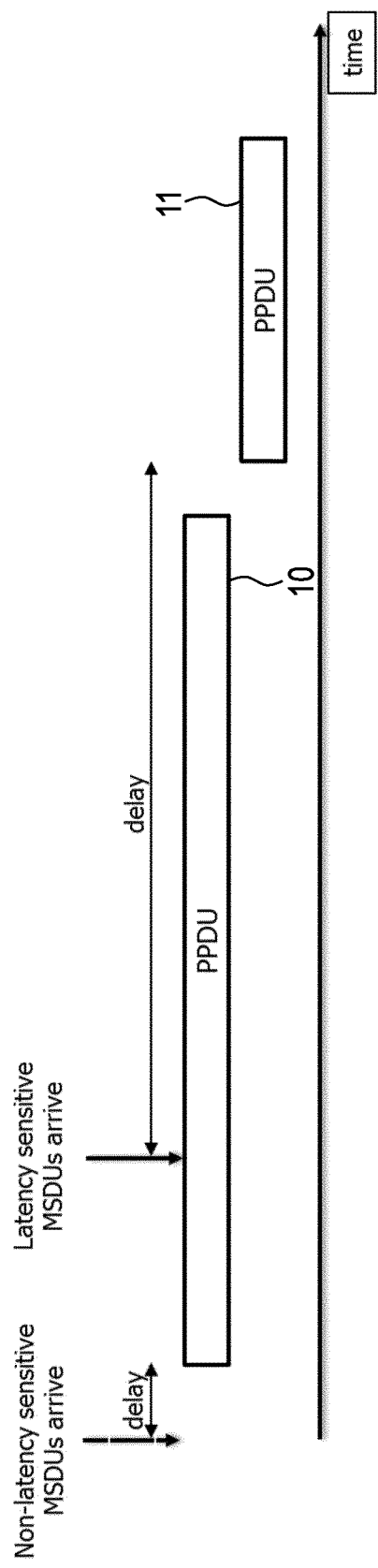
FIG. 2 shows a diagram illustrating non-latency and latency sensitive data transmission without PPDU truncation.
Figure 3:
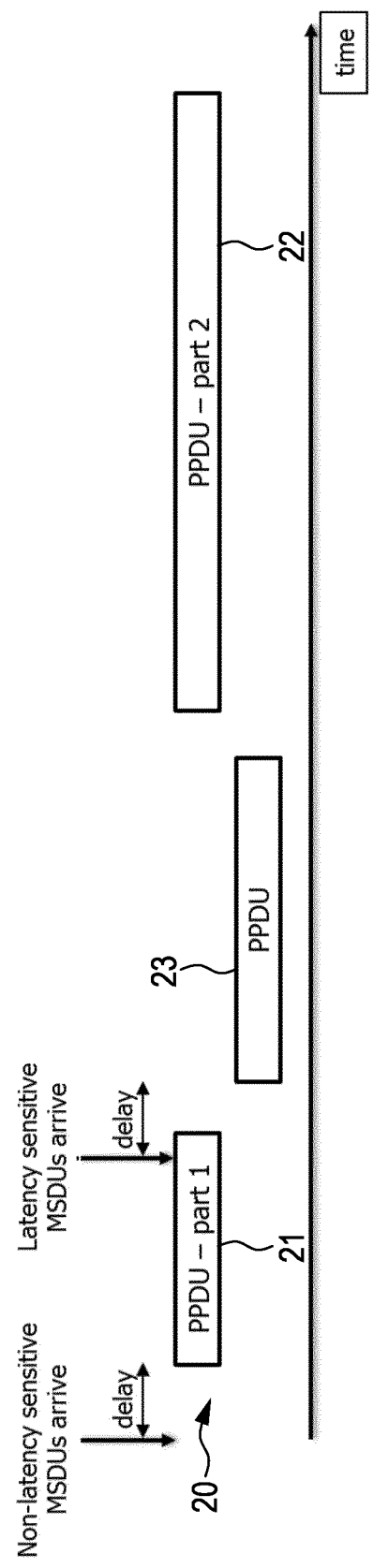
FIG. 3 shows a diagram illustrating non-latency and latency sensitive data transmission with PPDU truncation.

FIGS. 2 and 3 show diagrams illustrating the benefit of PPDU truncation with respect to low latency communications. According to FIG. 2, showing conventional WLAN behavior, PPDU truncation is not used; according to FIG. 3 PPDU truncation is used. It shall be noted that the MSDU arrival times are equal in both figures.

According to FIG. 2, the PPDU 10 holding the non-latency sensitive MSDUs is required to be finished before the latency sensitive MSDUs held in the PPDU 11 can be transmitted. This causes an unwanted queuing delay for the latency sensitive MSDUs because the latency sensitive MSDUs need to be buffered in a queue or memory until they can be transmitted. According to FIG. 3, however, the truncation of the PPDU 20 holding nonlatency sensitive data into two PPDU parts 21 and 22 allows for a speedy transmission of the PPDU 23 holding the latency sensitive data. Thus, the queuing delay of the latency sensitive MSDUs is smaller compared to FIG. 2. The queuing delay of the non-latency sensitive data increases in FIG. 3 compared to FIG. 2. Thus, PPDU truncation can provide a trade-off of queuing delay of different traffic types but not a reduction. It should be noted that non-latency sensitive and latency-sensitive MSDUs may target different STAs.

Within WLAN, PHY and MAC layer signal processing may in an embodiment be done block-wise. Several processing steps have different block lengths. The block lengths that may be respected for the envisioned PPDU truncation operation are LDPC code word length, OFDM symbol length, and MPDU data unit.

The MPDU data unit consists of (i) header information, (ii) (encrypted) user data, often MSDU, and (iii) frame check sequence (FCS). The FCS is used to detect transmission errors within the user data and/or header information. In case an error is detected, the MPDU is discarded and a retransmission may be requested from the transmitter of that MDPU. One or more MPDUs may be aggregated to an A-MPDU for transmission in a single PPDU (FIG. 1). Once the PSDU, i.e. MPDU or A-MPDU, is readily available in the MAC layer, or at least the amount of data to be transmitted is known, the PHY layer is triggered for transmission.

Figure 4:
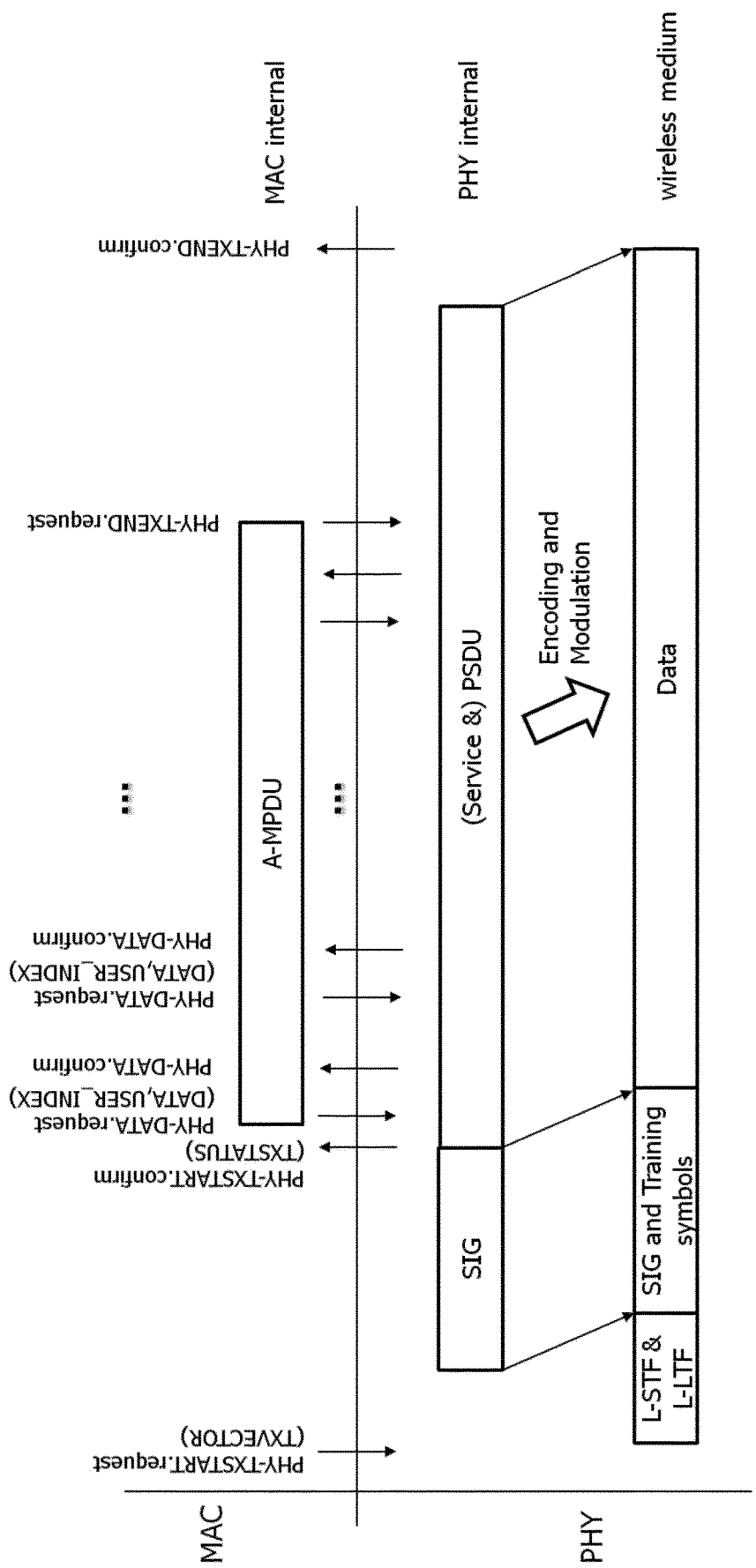
FIG. 4 shows a diagram illustrating the interaction between PHY and MAC for a transmission in WLAN.

FIG. 4 shows the interaction between PHY and MAC for a transmission, i.e. initiation of a PPDU transmission and data transfer between MAC and PHY. The MAC triggers the PHY to start transmission by PHY-TXSTART.request (TXVECTOR) function (or primitive). This request includes the TXVECTOR which holds one or more configuration parameters for the PHY such as length information of PHY input data unit (PSDU), modulation coding scheme (MCS), i.e. code rate and constellation diagram size, number of spatial streams, MIMO mode, bandwidth and RU size, etc.

Figure 5:
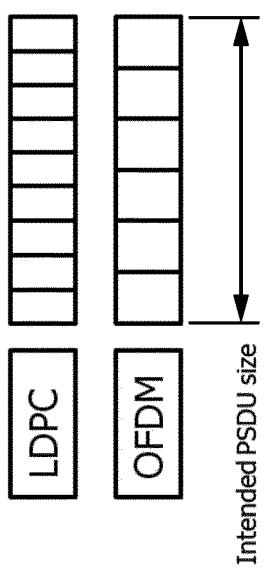
FIG. 5 shows a diagram illustrating block sizes in the PHY layer.

Based on this information, the PHY determines block sizes for LDPC and OFDM modulation and their respective structure. This process holds various steps and is omitted here because this is not part of the disclosed solution. The different block sizes are determined such that at least at the end (and preferably at the beginning as well) of the PSDU the borders of all blocks coincide. These block sizes and related block structures are kept fixed during the entire encoding and modulation process for the respective PPDU. FIG. 5 visualizes the block-wise operation and coincidence of block borders at the beginning and end of a PSDU.

In FIG. 4, following the PHY-TXSTART.request and block size computation, the PHY starts transmitting channel estimation sequences (STF, LTF) and training symbols as well as signaling information (SIG). The signaling information is used by the receiver to configure its PHY for reception of that PPDU. Once the SIG field data is compiled, the PHY reports to the MAC its readiness for data exchange by issuing the PHY-TXSTART.confirm (TXSTATUS) primitive. Following that, the MAC sends data to the PHY by using the PHYDATA.request (DATA, USER_INDEX) primitive. Thereby, DATA holds the actual data to be transmitted for the user identified by USER_INDEX. Often, the DATA is of size 1 octet. The PHY confirms successful data transfer by issuing the PHY-DATA.confirm primitive. The data exchange continues until the MAC issues the PHY-TXEND.request indicating to the PHY to terminate transmission. After that the PHY notifies the MAC that transmission ended by PHY-TXEND.confirm once it does not transmit on the wireless medium anymore.

It is possible for the MAC to truncate PPDU transmission at any time by the PHYTXEND.request primitive. In this case, the last OFDM symbol is stuffed. This type of truncation is lossy as it comes with data loss or partially damages PPDU, which cannot be demodulated by the receiver. Furthermore, it is not clear to the receiver what caused the PPDU truncation. It could be carrier loss, interference as well as an intentional truncation.

The envisioned behavior is as follows: The MAC may notify the PHY to truncate the transmission at next suitable point in time. Several steps may be performed by MAC and PHY such that the truncation is (almost) loss less. First, processing on the transmitter side will be described before processing on the receiver side will be outlined.

Figure 6:
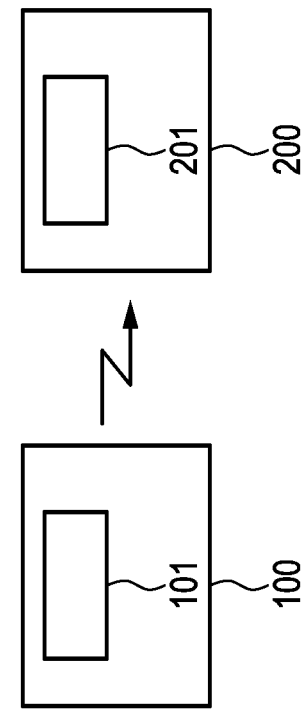
FIG. 6 shows a schematic diagram of communication devices according to the present disclosure.

FIG. 6 shows a diagram illustrating a communication device 100 according to an aspect of the present disclosure for transmitting data to another communication device 200, wherein each of the communication devices comprises circuitry 101, 201 configured to perform particular operations. The circuitries may be implemented by a respective processor or computer, i.e. as hardware and/or software, or by dedicated units or elements. For instance, respectively programmed processors may represent the respective circuitries 101, 201.

Figure 7:
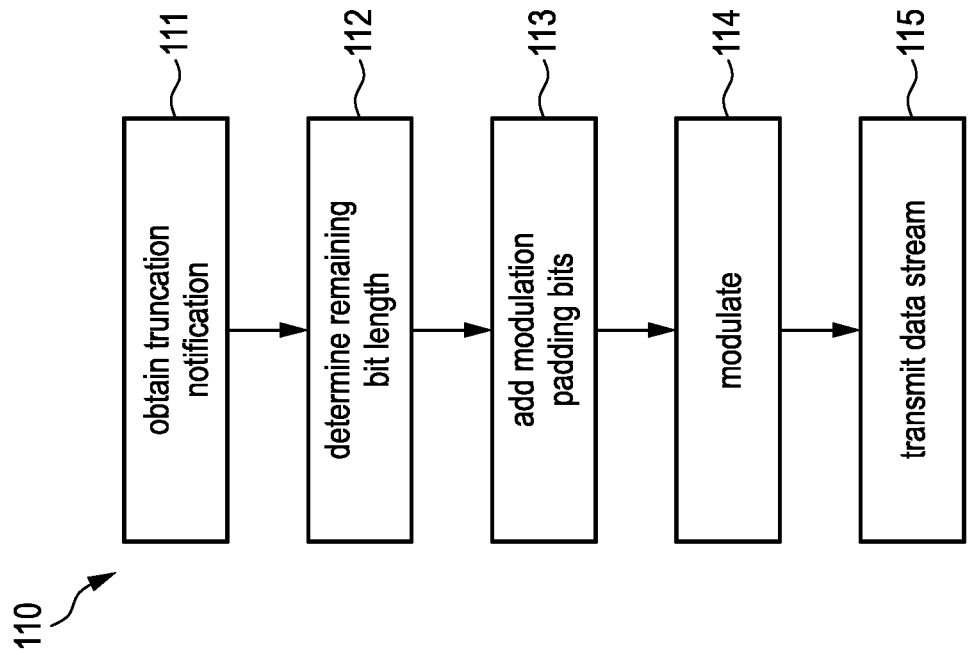
FIG. 7 shows a flow chart of an embodiment of a communication method on the transmission side according to the present disclosure.

FIG. 7 shows a flow chart of a communication method 110 according an embodiment of the present disclosure, which may be performed by the circuitry 101 of the communication device 100 on the transmission side. In a first step 111 a truncation notification indicating that an ongoing transmission of a data unit (e.g. physical layer protocol data unit—PPDU) shall be truncated is obtained, e.g. from the MAC layer or another layer or an external control unit (e.g. a station management entity (SME)). In response to the truncation notification, based on the number of unprocessed modulation input bits of the data unit, a remaining bit length of a modulation input block is determined (step 112). A number of modulation padding bits corresponding to the determined remaining bit length of a modulation input block is added (step 113) to the unprocessed modulation input bits to obtain a complete modulation input block. Subsequently, the complete modulation input block is modulated (step 114) to obtain a modulation output block. Finally, a transmit data stream containing the obtained modulation output block is transmitted (step 115) to the other communication device 200.

Figure 8:
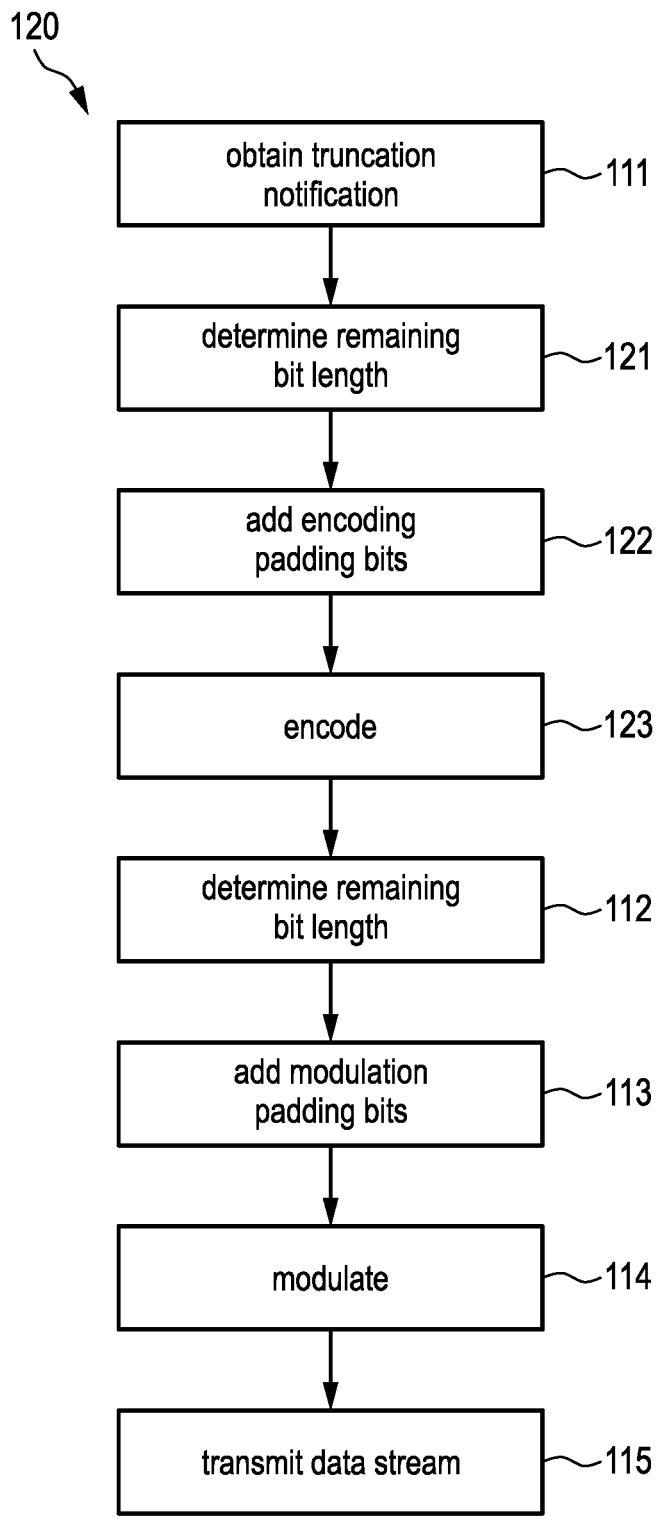
FIG. 8 shows a flow chart of another embodiment of a communication method on the transmission side according to the present disclosure.

FIG. 8 shows a flow chart of another embodiment of a communication method 120, which may be performed by the circuitry 101 of the communication device 100. According to this embodiment, not only modulation padding bits are added, but also encoding padding bits. In particular, in response to the truncation notification (i.e. after step 111), based on a current bit length of encoding input bits, a remaining bit length of an encoding input block is determined (step 121). Padding to add a number of encoding padding bits corresponding to the determined remaining bit length of an encoding input block to the current bit length of encoding input bits is then performed (step 122) to obtain a complete encoding input block. The complete encoding input block is then encoded (step 123) to obtain an encoding output block for subsequent modulation. Subsequently, steps 112 to 115, as described above with reference to FIG. 7, are carried out.

Figure 9:
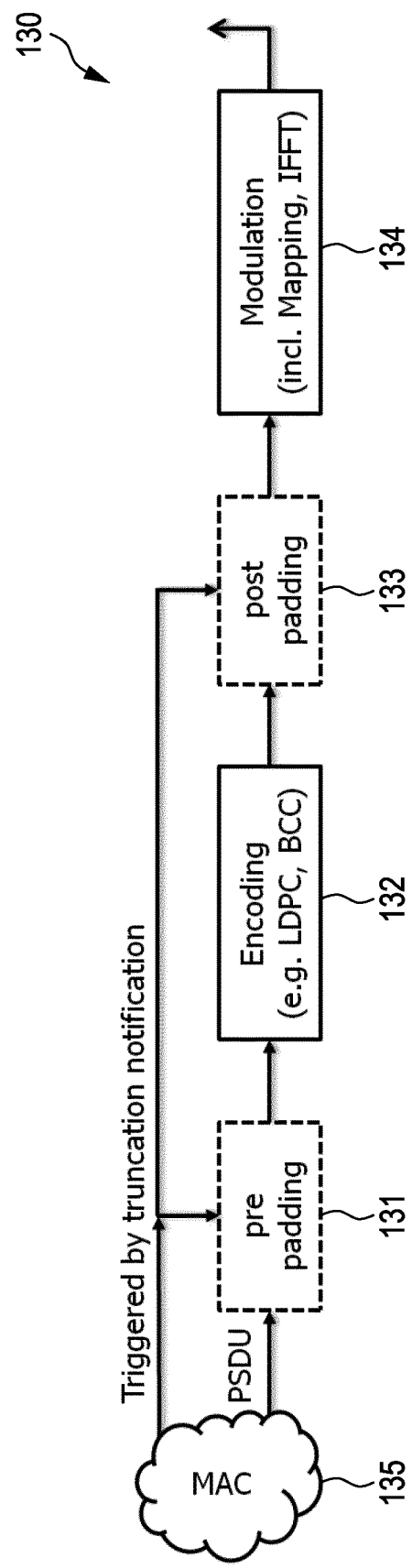
FIG. 9 shows a simplified diagram of an embodiment of a communication device on the transmission side according to the present disclosure.
Figure 10:
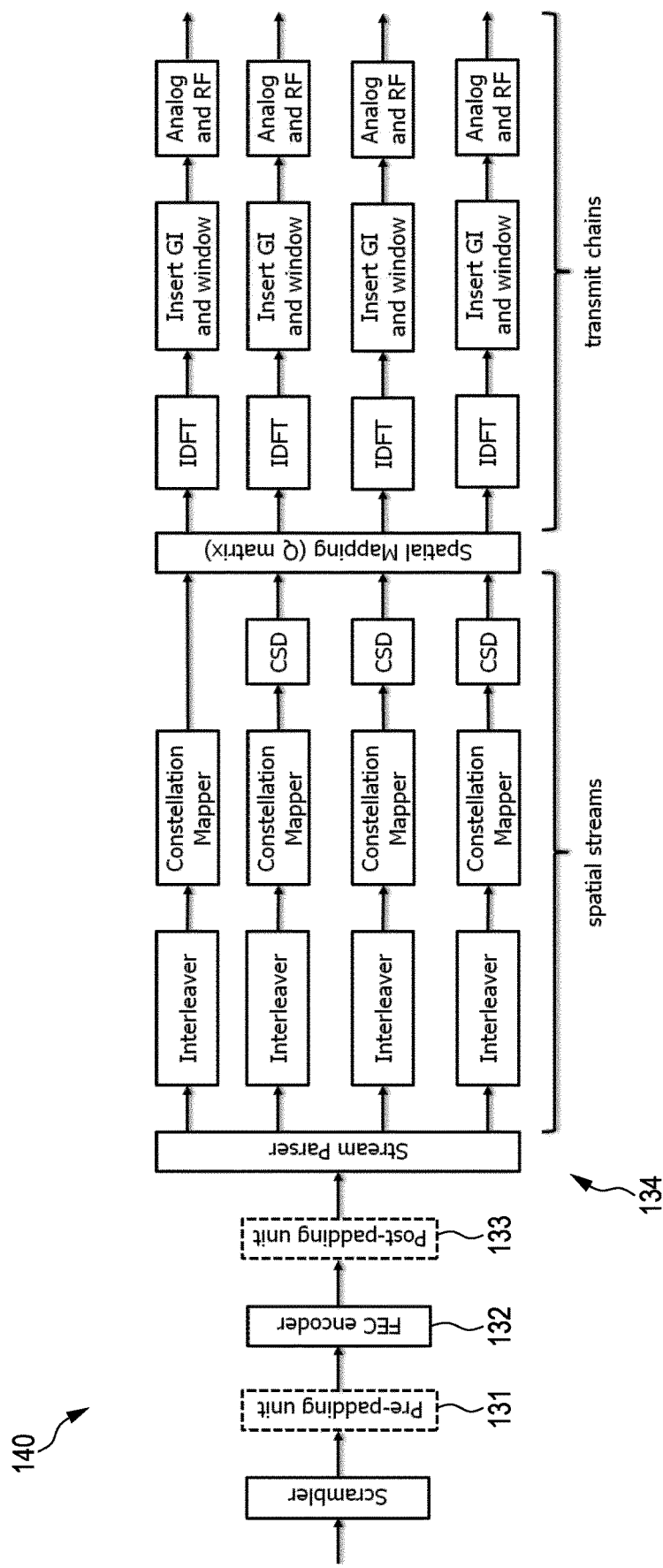
FIG. 10 shows a more detailed diagram of another embodiment of a communication device on the transmission side according to the present disclosure.

FIG. 9 shows a schematic (simplified) diagram of an embodiment of a communication device 130 on the transmission side according to the present disclosure, in particular of the PHY layer. A (more detailed) diagram of another embodiment of a communication device 140 on the transmission side according to the present disclosure is shown in FIG. 10. The communication device 130 comprises a pre-padding circuitry 131, an encoding circuitry 132, a post-padding circuitry 133 and a modulation circuitry 134. The pre-padding circuitry 131 may perform steps 111, 121 and 122 (see FIG. 8), the encoding circuitry 132 may perform step 123, the post-padding circuitry 133 may perform steps 112 and 113, and the encoding circuitry 134 may perform step 114 (and optionally step 115, which may alternatively be performed by (not shown) transmission circuitry). Alternatively, step 111 may be performed by the MAC layer 135 or the SME.

In an embodiment, the operation of the pre- and post-padding circuitry in the proposed setup is determined occasionally subsequent to a truncation notification. Once a truncation notification has been received (e.g. from the MAC layer 135), the following steps may be performed in the dashed blocks. The other blocks continue to operate in the normal manner, i.e. they use the same settings as before. These settings have been determined at the point in time when the MAC has requested the PHY layer to start a transmission with the parameters signaled in TXVECTOR, i.e. based on information contained in PHYTXSTART.request primitive.

Figure 11:
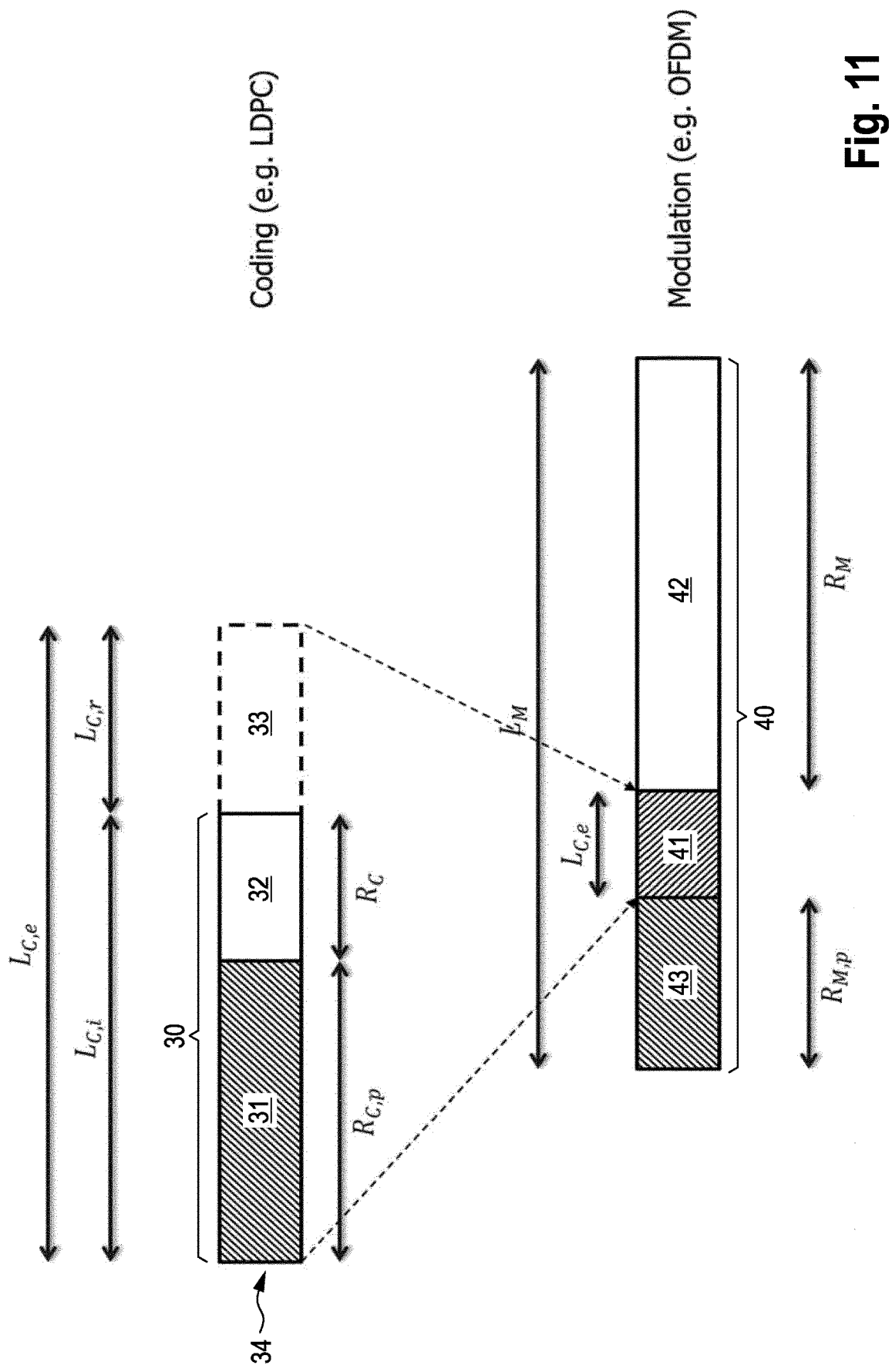
FIG. 11 shows a diagram illustrating the block lengths for PPDU truncation with block encoding.

FIG. 11 shows a diagram that visualizes the operation of the communication device 130 with block encoding (e.g. LDPC encoding). All parameters labeled with L are determined at the beginning of transmission and are unchanged during operation, whereas all parameters labeled with R are computed instantly when a truncation notification is received.

Figure 12:
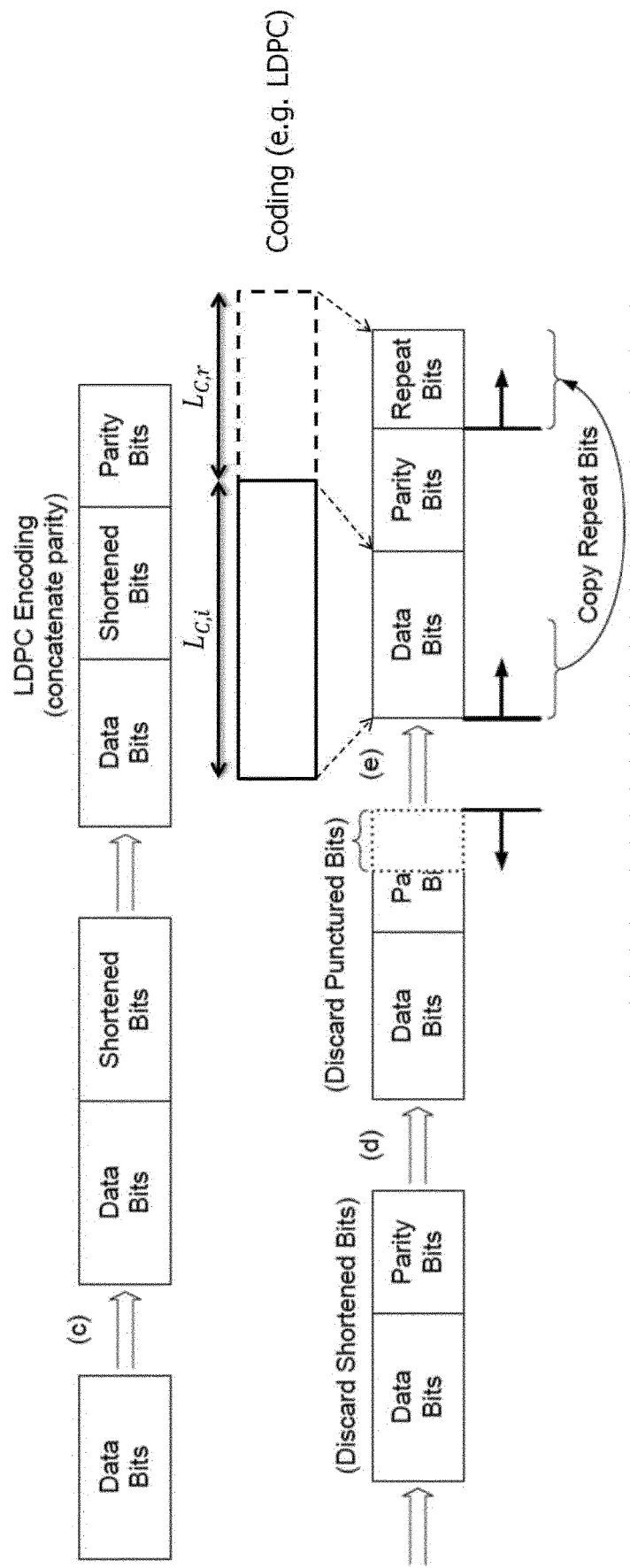
FIG. 12 shows a diagram a diagram illustrating the relation of the coding block size to the encoding in WLAN.

The encoding circuitry 132 operates with an input block size of $L_{C,i}$ bits and an output block size of $L_{C,e}$ bits. $L_{C,r} = L_{C,e} - L_{C,i}$ bits of redundancy data are added which consist of (punctured or non-punctured) code parity bits and/or repetition of data bits. This relation is illustrated in more detail in FIG. 12. In contrast, the modulation circuitry 134 has an input block size of $L_M$ bits. At the point in time a truncation notification is received, $R_{C,p}$ unprocessed bits reside in the encoder circuitry 132 and $R_{M,p}$ unprocessed bits reside in the modulation circuitry 134.

In an embodiment the pre-padding circuitry 132 may perform the following steps:

i) Determine the remaining bit length $R_C = L_{C,i} - R_{C,p}$ of the size of the encoding input block 30 (i.e. PSDU). The encoding input block 30 comprises already information bits 31, but is not completely filled.

ii) Add $R_C$ bits (the encoding padding bits 32) in order to fill the current encoding input block 30.

iii) Perform the encoding process by appending redundancy information 33 of length $L_{C,r}$.

iv) Forward the encoding output block 34 of $L_{C,e}$ bits to the modulation circuitry 134.

The post-padding circuitry 134 may perform the following steps:

i) Determine the remaining bit length $R_M$ of the size of the modulation input block 40 of the current modulation (e.g. OFDM) symbol. The modulation input block 40 already contains modulation input bits 41 (corresponding to the encoding output block 34) and unprocessed modulation input bits 43 (corresponding to e.g. earlier encoded output blocks), but is not completely filled. The remaining length $R_M$ is given by $$R_M = \begin{cases} L_M - R_{M,p} - L_{C,e} & \text{if } L_M < R_{M,p} + L_{C,e} \\ 2L_M - R_{M,p} - L_{C,e} & \text{if } L_M \geq R_{M,p} + L_{C,e} \end{cases} \quad (1)$$

ii) Add $R_M$ bits (the modulation padding bits 42) in order to fill the current input block ($1^{st}$ condition of (1)) or perform the modulation process for the first modulation input block and add $R_M$ bits (randomly or all zero) in order to fill the $2^{nd}$ input block ($2^{nd}$ condition of (1)).

iii) Perform the modulation process for the last modulation input block and transmit the modulation output block(s) (i.e. PPDU(s)).

After the last modulation output block has been transmitted the transmission is stopped and an indication to the MAC layer that transmission has been truncated may be issued.

Equation (1) assumes that $L_M \leq L_{C,r}$. If this condition is not met, more than two modulation output blocks may be generated before transmission is truncated. In this case $$R_M = NL_M - R_{M,p} - L_{C,e}, \text{ with } N = \left\lceil \frac{R_{M,p} + L_{C,e}}{L_M} \right\rceil$$

holds ($\lceil \cdot \rceil$ denotes rounding up operation) and N−1 modulation input blocks may be processed before padding is performed in the $N^{th}$ modulation input block.

It should be noted that the remaining lengths $R_C$ and $R_M$ can also be computed at the same time when the truncation notification arrives as $R_M$ after the padding and encoding step can be predicted.

The scheme described above with reference to FIG. 11 is particularly used by encoders that employ block-wise encoding such as LDPC codes. For encoders that operate continuously such as BCC encoder, the operation is somewhat different as will be explained in the following.

The pre-padding circuitry 131 appends $R_M$ bits in total but at least the last $L_{C,e}$ bits of the $R_M$ bits are set to zero. This is because the last $L_{C,e}$ bits are used to return the BCC encoder, which may comprise a shift register, in zero state. In an exemplary implementation, $L_{C,e}$ is either 6 or 12 bits for WLAN BCC case. The post-padding circuitry 133 is not present.

Figure 13:
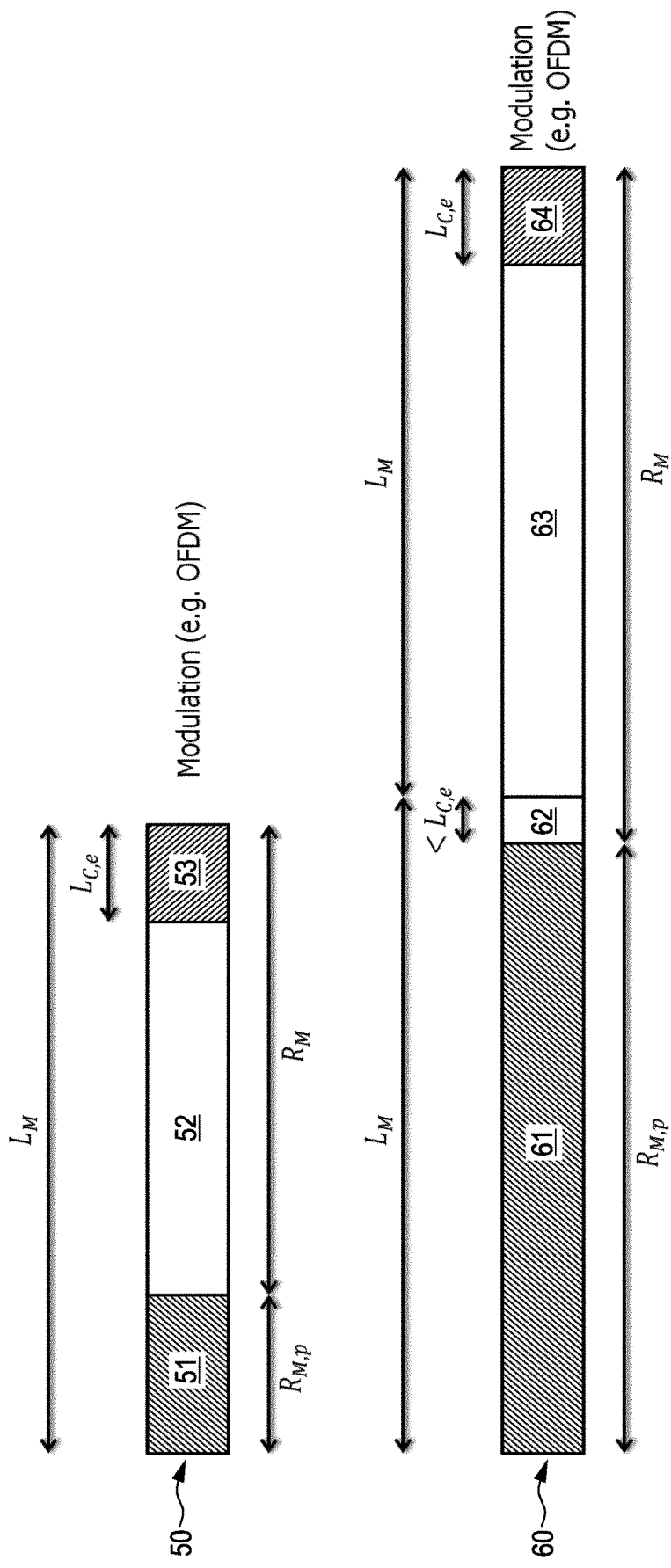
FIG. 13 shows a diagram illustrating the padding procedure with continuous encoding.

FIG. 13 shows a diagram illustrating the padding procedure for a continuous encoder, e.g. a BCC encoder. FIG. 13A shows a first embodiment of a modulation input block 50. It is assumed that $L_{C,e}$ is smaller than or equal to $R_M$. If this is not the case a new modulation block of size $L_M$ is added to the transmit signal and padding is done as shown in FIG. 13B showing another embodiment of two modulation input blocks 60. In FIG. 13A, 51 are the encoded information bits (encoded by BCC) present in the unprocessed modulation input block at the point in time a truncation notification is received. 52 are the padding bits with arbitrary value. 53 are the padding bits with zero value ($L_{C,e}$).

In FIG. 13B, 60 are two modulation input blocks because $L_{C,e}$ is larger than the remaining modulation input block length at the point in time of truncation notification. 61 (=51) are the encoded information bits (encoded by BCC) present in the unprocessed modulation input block at the point in time a truncation notification is received. 62 is the remaining modulation input block length at the point in time of truncation notification is less than $L_{C,e}$. 62 are also the padding bits with arbitrary value in the first modulation input block. 63 are the padding bits with arbitrary value in the second modulation input block. 62 and 63 are thus the padding bits with arbitrary value. 64 (=53) are the padding bits with zero value ($L_{C,e}$).

The number of padded bit in both cases is $$R_M = \begin{cases} L_M - R_{M,p} & \text{if } L_{C,e} \leq L_M \leq -R_{M,p} \\ 2L_M - R_{M,p} & \text{if } L_{C,e} > L_M \leq -R_{M,p} \end{cases}$$

In this embodiment, BCC encoding may reside in the same position as the encoding circuitry 132 shown in FIGS. 9 and 10. The BCC encoding has a continuous (in contrast to block wise) operation. Once a data bit goes in, a data bit and a parity bit goes out (for code rate ½). In the BCC case, there is only a pre-padding circuitry 132 that appends padding bits to fill a modulation block. The last $L_{C,e}$ bits of these padding bits are preferably zero. This is to return to BCC encoder in zero state at the end of transmission. There is no post-padding circuitry 133. The parities are distributed over the output bit stream. BCC encoding is, hence, performed after pre-padding and before modulation.

The bits that are added in the padding circuitries may be either predefined (e.g. all zero, all one) or random (for the continuous encoder restrictions may apply). If the bits have a predefined value, they may be used in the receiver to improve demodulation and decoding. Simple receiver architectures require however that the number of bits padded in the pre- and post-padding circuitry is known. These data can be signaled by the transmitter before the truncation is done, as will be explained below.

In an embodiment (also called variant 1), given that the output block size of the encoding $L_{C,e}$ and the input block size of the modulation $L_M$ unit are an integer multiple or an integer fraction of each other, the post-padding circuitry may be omitted. In this case the prepadding circuitry may pad that many bits such that coding and modulation boundaries are simultaneously fulfilled.

In another embodiment (also called variant 2), given that the MAC layer provides further data to be transmitted although it notified the PHY to truncate transmission, the encoder may continue encoding user data such that a coding input block of length $L_{C,i}$ is filled. The modulation circuitry either adds additional bits or removes bits to achieve the modulation block size. The truncation should only be done when no coding block that contains user data, which has been received before the truncation notification arrived, is affected.

Figure 14:
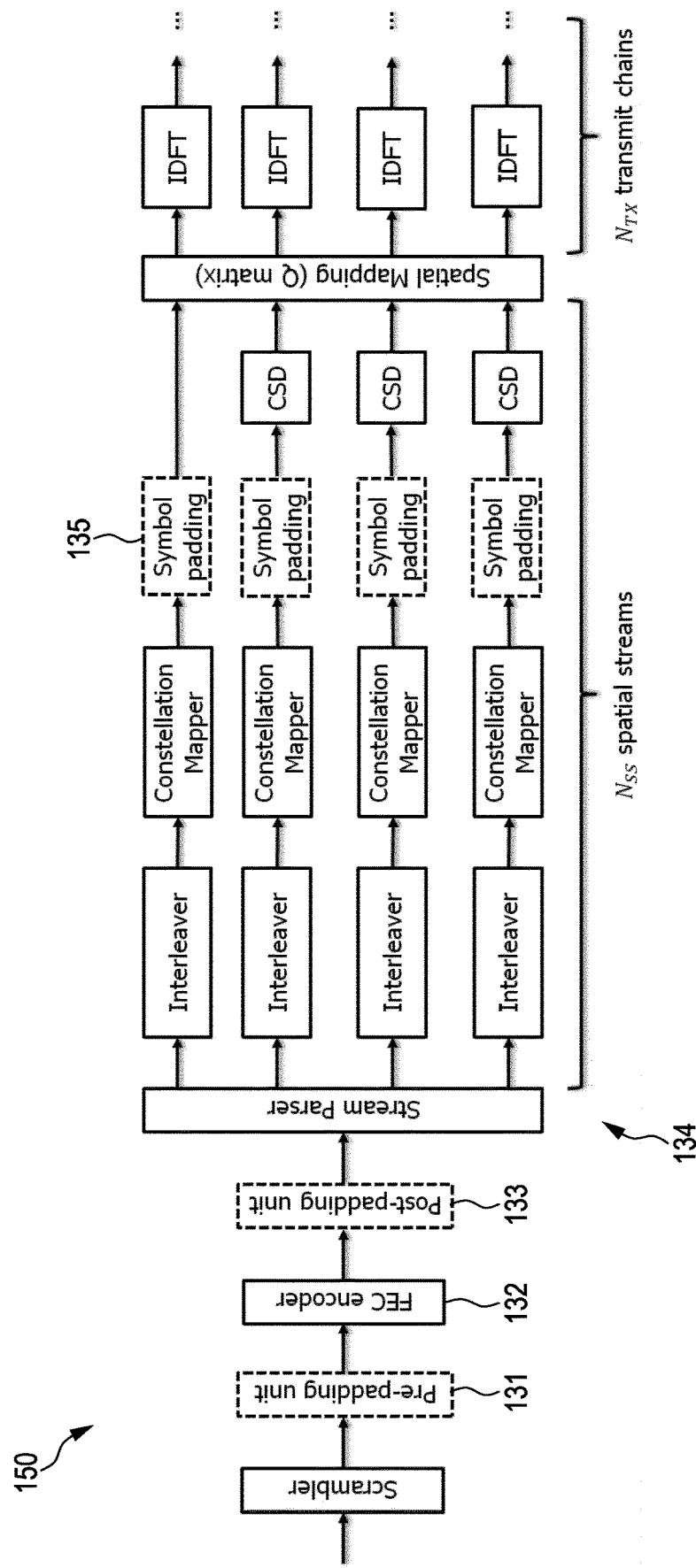
FIG. 14 shows a schematic diagram of another embodiment of a communication device on the transmission side according to the present disclosure.

The post-padding circuitry may partly be moved into the modulation circuitry. Thus, not only bit padding but also symbol padding may be performed. As can be seen from FIG. 10, the transition from bit to symbol level includes the stream parser operation, which allocates the bit stream to each spatial stream in a round robin fashion. Thus, a symbol padding circuitry 135 operating on stream s (as provided in the embodiment of the communication device 150 on the transmission side illustrated in FIG. 14) pads $R_{M,sym}(s)$ symbols as part of the post-padding procedure, wherein $R_{M,sym}(s)$ is given by equation (2):

$$R_{M,sym}(s) = \left\lfloor \frac{R_M}{\sum_{s=1}^{N_{SS}} m(s)} \right\rfloor \quad (2)$$

wherein m(s) denotes the number of bits per symbol of the constellation diagram used for stream s (e.g. m=2 for QPSK). The equation (2) uses a floor operation. Since symbols may combine more than one bit per symbol, limitations may apply to the symbol level padding because not any number of $R_M$ bits may be represented. Thus, a post-padding on bit level may still be required which pads $$R_{M,bit} = R_M - \sum_{s=1}^{N_{SS}} R_{M,sym}(s) \cdot m(s)$$

bits before symbol padding is performed.

It may be envisioned that the PHY transmits a truncation postamble after the padding process has ended. The truncation postamble is to inform the receiver PHY layer about the fact that transmission truncation was intentional. This information may be passed to the receiver MAC for further processing, because there may be a need to differentiate between an unintentional (e.g. signal loss) or an intentional PPDU truncation.

Figure 15:
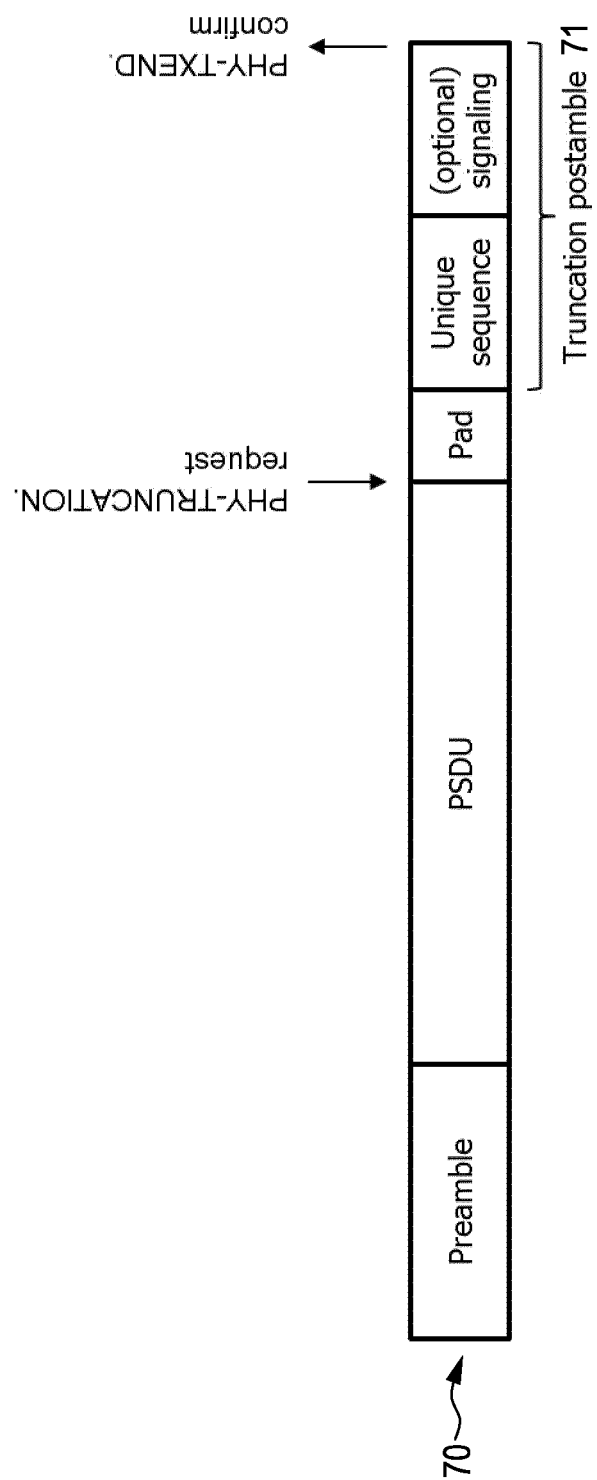
FIG. 15 shows a diagram of a modulation output block including a truncation postamble.

This signaling may comprise a unique symbol sequence or bit sequence such as an STF or LTF for example. Such a unique sequence may fit within one or more modulation blocks of size $L_M$ and may hold signaling information as well, for which a special (e.g. standardized) encoding may be applied. FIG. 15 shows a diagram of a modulation output block 70 including a truncation postamble 71. After the PHY receives the request to truncate to ongoing PPDU, it may perform first padding as described above, followed by the addition of a unique sequence, which optionally includes signaling. After the transmission has ended, the transmitter PHY may inform the transmitter MAC of the transmission end.

Figure 16:
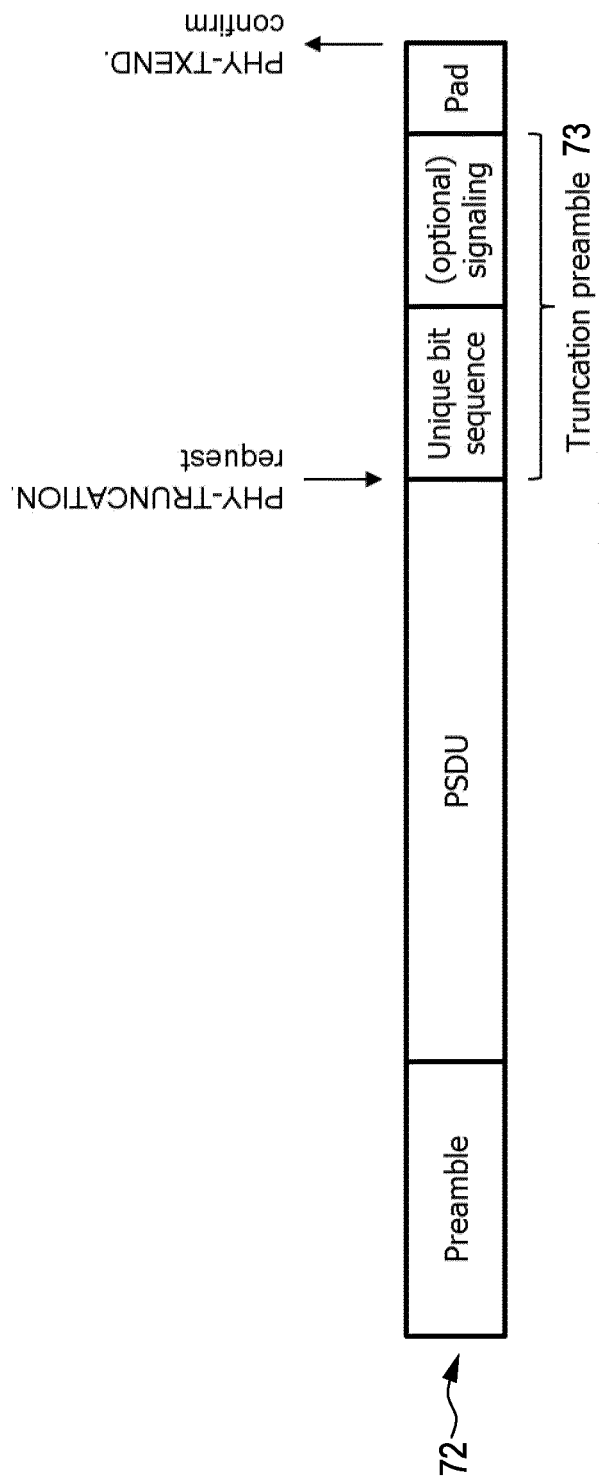
FIG. 16 shows a diagram of a modulation output block including a truncation preamble.

Similar to a postamble as shown in FIG. 15, a preamble may be suitable as well. In this case, the PHY transmits a truncation preamble after having received a truncation request and before the padding process begins. This signaling comprises a unique bit sequence. In contrast to the postamble, this unique sequence is a bit sequence that may or may not fit into one or more modulation output blocks of size $L_M$. After the unique bit sequence and the (optional) signaling information has been added to the bit stream, the padding procedure as described above begins. FIG. 16 shows a diagram of a modulation output block 72 including a truncation preamble 73.

Another signaling variant uses the padding itself. The padding bit pattern of variable length may be taken from a unique and standardized bit sequence. The receiving PHY may thus be able to detect if a truncation was made intentionally by comparing the received bits with the padding bit pattern. The longer the padding bit pattern is, the higher the likelihood of a correct detection.

Figure 17:
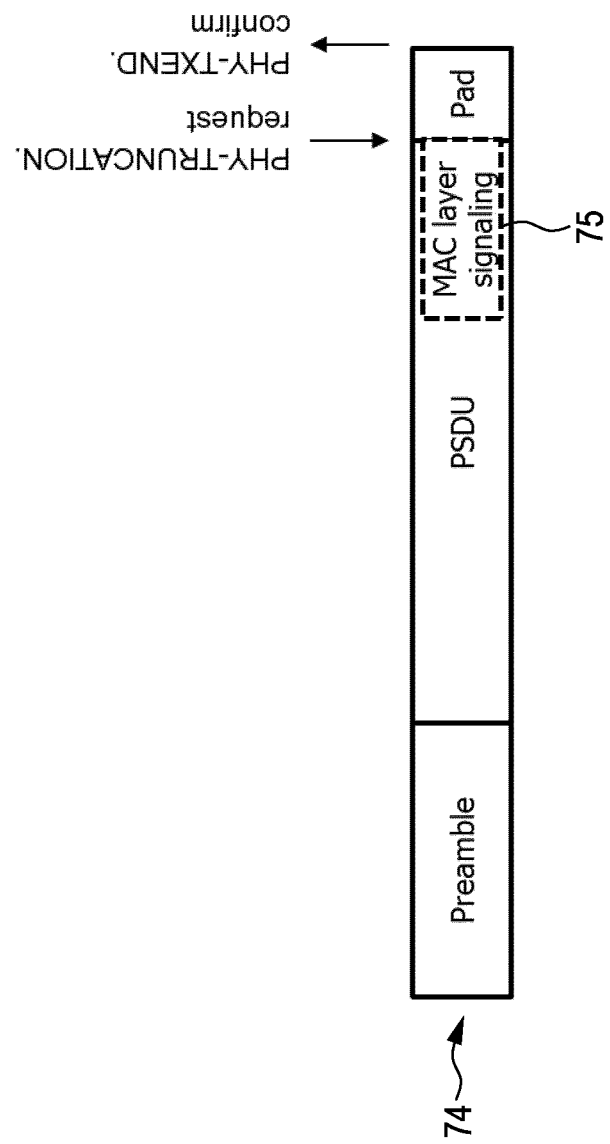
FIG. 17 shows a diagram of a modulation output block including MAC layer signaling.

Another variant comprises the signaling as part of the MAC layer data stream. Thus, the MAC layer may add signaling to the A-MPDU that is being transmitted. It can be in the form of a special control or management frame or special delimiter. The MAC may then request the truncation after it has forwarded the MAC layer truncation signaling to the PHY layer. FIG. 17 shows a diagram a modulation output block 74 illustrates the truncation operation with MAC signaling 75 only. It should be noted that since the truncation signaling resides within the PSDU, it cannot be exploited by the PHY. In general, the MAC layer truncation signaling can be combined with PHY layer signaling variants, i.e. PHY layer pre- or postamble or fixed bit pattern padding.

Furthermore, the preamble of a PPDU may hold an indication that the PSDU part of the transmitted PPDU may be subjected to truncation. This information is provided for the receiver to expect intentional PPDU truncation for the particular PPDU.

The receiving PHY performs the following steps in case no truncation signaling is present. A PPDU is received as usual by synchronizing to the preamble, extracting preamble information, configuring demodulation and decoder unit according to preamble information, and performing demodulation and decoding. If a modulation output block (e.g. OFDM symbol) has been received completely and transmission stopped after that modulation block, the MAC is informed via a primitive that the unexpected PPDU truncation may be intentionally, and the potentially unfinished code word (e.g. LDPC code word; this option applies for variant 2) is discarded before forwarding the received data to the MAC.

The receiving PHY performs the following steps in case a truncation signaling is present. A PPDU is received as usual by synchronizing to the preamble, extracting preamble information, configuring demodulation and decoder unit according to preamble information, and performing demodulation and decoding. Then, the received signal during reception process is correlated with the unique (bit or symbol) sequence in order to detect an intentional truncation. Once the unique sequence is detected, the signaling information may be extracted and the receiving communication device may act according to the signaling information provided. This includes that the receiving PHY may discard any padding bits before forwarding the data to the MAC. If signaling is present or not, the PHY may inform the MAC via a primitive that the unexpected PPDU truncation was made intentionally.

Any signaling that comes with the truncation preamble or postamble may signal one or more of the following data:
reason for the truncation for use in the receiver MAC layer to take appropriate steps;
number of padded bits in the pre- and/or post-padding circuitry for the receiving PHY to discard the padding bits before forwarding to the MAC; and
value of the padding bits for improved decoding and demodulation, which provides a priori data for decoding and demodulation.

Figure 18:
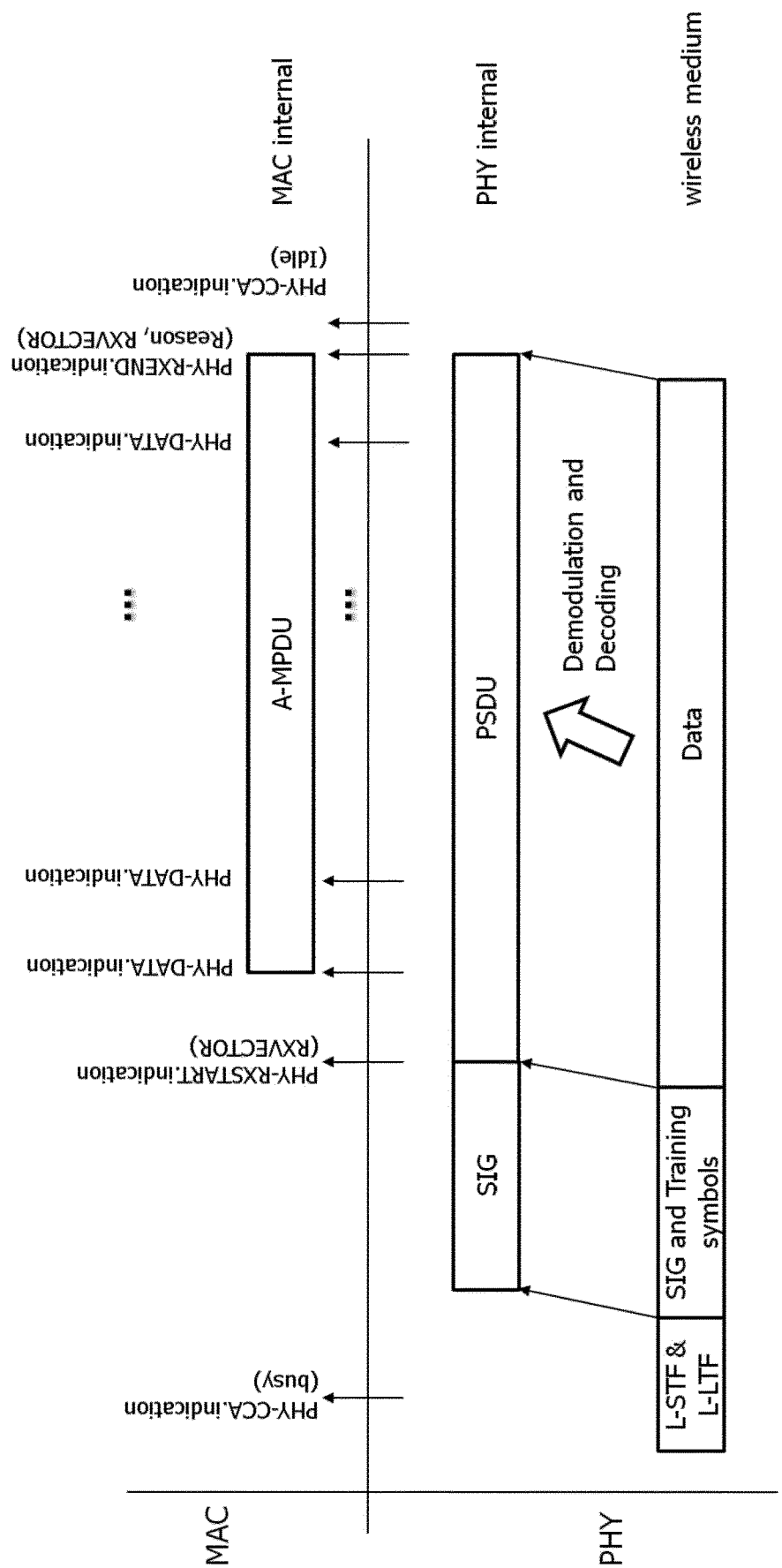
FIG. 18 shows a diagram illustrating the receive procedure according to an embodiment of the present disclosure.

The receive procedure according to an embodiment of the present disclosure is illustrated in FIG. 18. Once the PHY detects an L-STF, it gives a carrier clear assessment (CCA) with a busy value to the MAC. Subsequently, the PHY receives signaling information and training symbols. This information is used to configure its receiver and to signal the start of data reception to the MAC including receive parameters, i.e. the RXVECTOR. Subsequently to receiver configuration, the PHY demodulates and decodes the received OFDM symbols. The information (user) data is forwarded to the MAC layer via one or more successive PHY-DATA.indication primitives. Often, one primitive conveys one octet of received PSDU data. When the reception ends, the PHY issues a PHY-RXEND indication holding the reason for the PPDU ending. Shortly thereafter, the CCA returns to idle.

The reason signaled in the PHY-RXEND indication can be the following: no error, format violation, carrier lost, unsupported rate, and/or filtered. According to the present disclosure, the receiver may differentiate another reason, which is 'intended truncation'. This reason may generated as follows.

If no PHY pre- or postamble or unique padding pattern is present (first variant), the PHY may issue the 'intended truncation' reason, if the received PPDU ended before intended end and if the ending of the received PPDU corresponds to the operations performed for intended PPDU truncation at the transmitter (as described above). For the most general case, this means that the last OFDM symbol has been completely received.

If a PHY pre- or postamble or unique padding pattern is present (second variant), the PHY may issue the 'intended truncation' reason, if the received PPDU holds any of the PHY signaling variants and the ending of the received PPDU corresponds to the operations performed for intended PPDU truncation at the transmitter.

As the second variant is much more reliable than the first variant with respect to a wrong detection, it should be preferably applied. Assuming OFDM symbol length of $L_M$ samples, the probability of a wrong detection, i.e. the PHY issues 'intended truncation' although it was a 'carrier lost', is $L_M^{-1}$.

Figure 19:
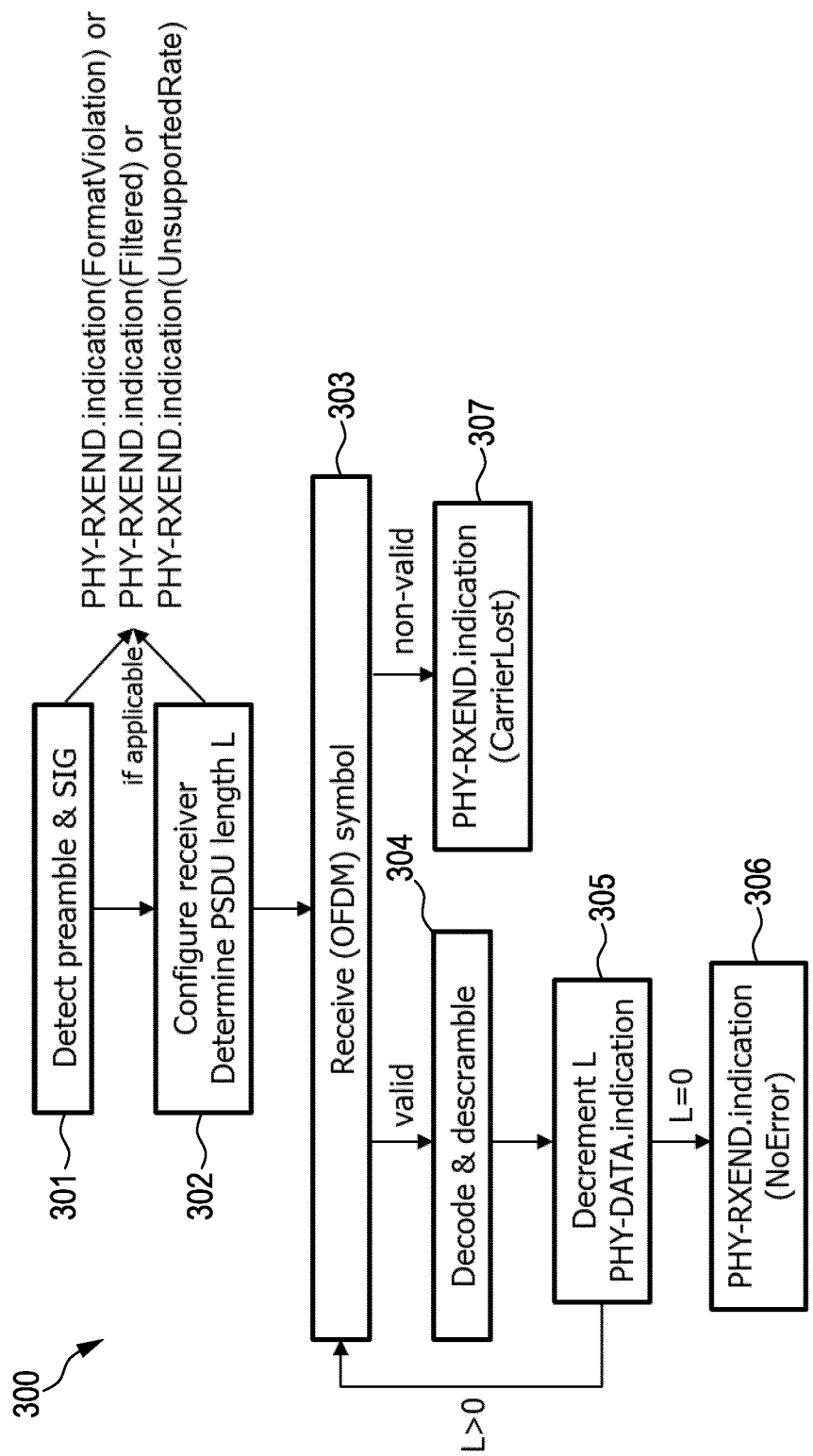
FIG. 19 shows a simplified diagram (in the form of a state machine) of a communication device on the reception side according to conventional WLAN.

FIG. 19 shows a simplified diagram (in the form of a state machine) of a communication device 300 on the reception side according to conventional WLAN, in particular of the PHY layer. Once a preamble (step 301) is detected, the receiver is configured (step 302) according to the signaling and channel estimation sequences present in the PHY preamble. The receiver configuration holds length information of the PSDU part L. Following that, (OFDM) symbols are received (step 303), decoded and descrambled (step 304), and forwarded to the MAC until the PSDU ends (step 305), i.e. L=0, and a NoError indication is given (step 306) to the MAC. If a non-valid signal in received, a CarrierLost indication is issued (step 307) to the MAC.

Figure 20:
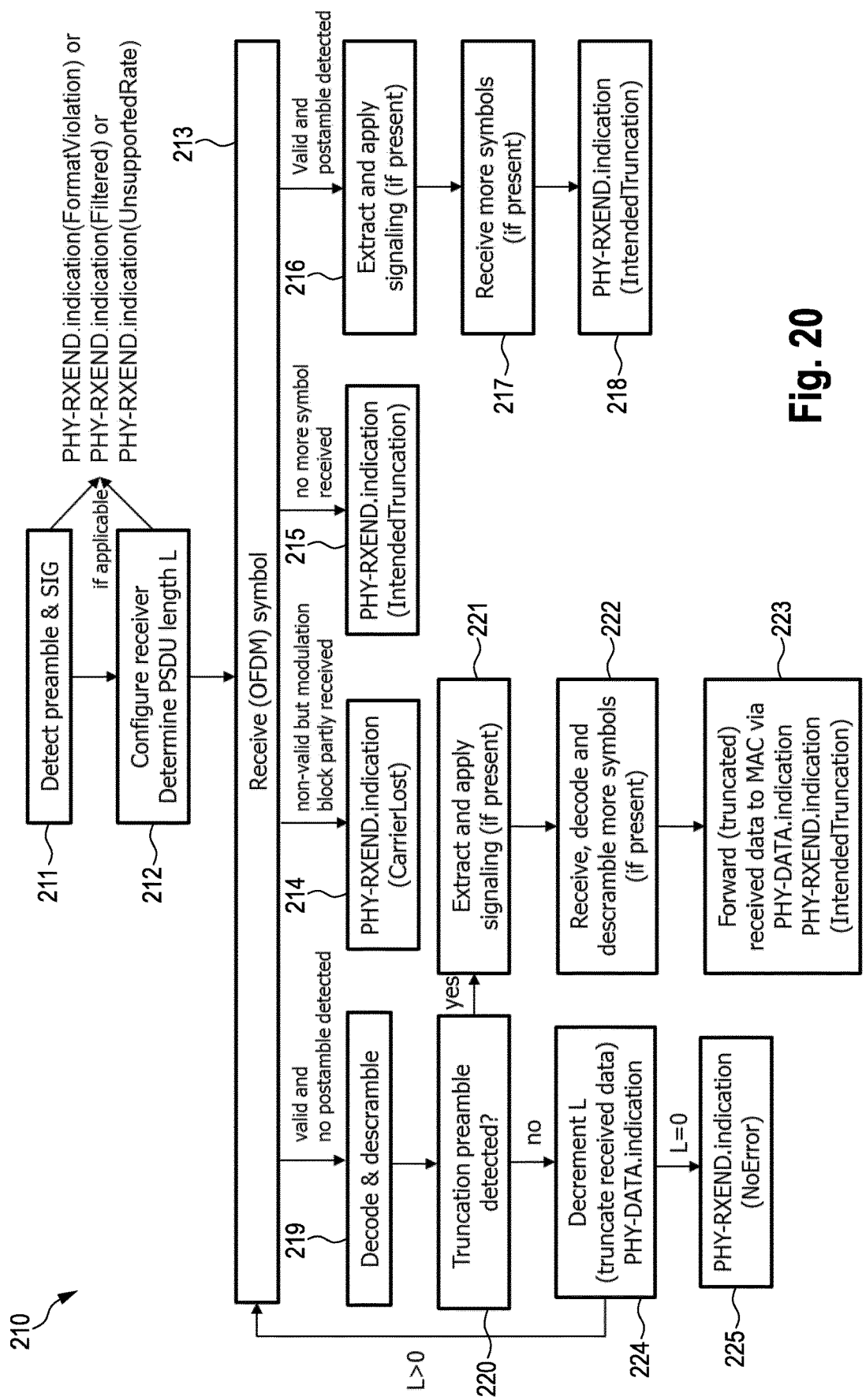
FIG. 20 shows a schematic diagram (in the form of a state machine) illustrating various embodiments of a communication device on the reception side according to the present disclosure.

FIG. 20 shows a schematic diagram (in the form of a state machine) illustrating various embodiments of a communication device 210 on the reception side according to the present disclosure. The communication device 210 implements detection of an intentionally truncated PPDU. It shall be noted that not all blocks may actually be present in an implementation of such a communication device, e.g. in case a subset of signaling variants is to be supported. Steps 211 to 213 substantially correspond to steps 301 to 303 shown in FIG. 19 and are thus not explained again.

Figure 21:
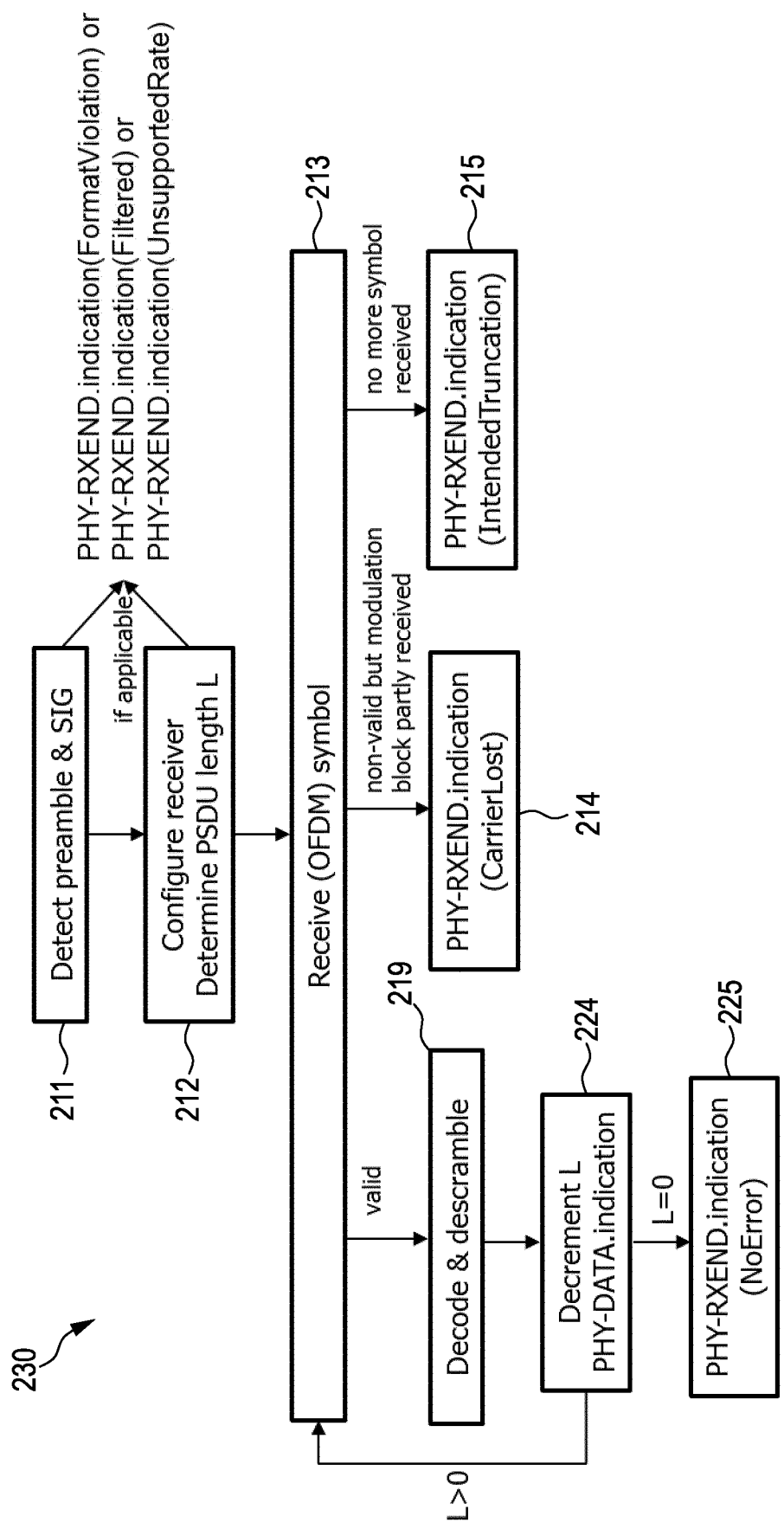
FIG. 21 shows a schematic diagram (in the form of a state machine) illustrating an embodiment of a communication device on the reception side according to the present disclosure.

In case no signaling is present, the receiver checks if a modulation output block is partly received. If so, the PHY assumes (step 214) CarrierLost as the reason of PPDU truncation, if not the PPDU truncation is potentially intentional (step 215) with a certain likelihood (see above). A schematic diagram (in the form of a state machine) of such an embodiment of a communication device 230 is separately shown in FIG. 21. A simplified schematic diagram of this communication device 230 comprising demodulation circuitry 231 and decoding circuitry 232 is shown in FIG. 24.

Figure 22:
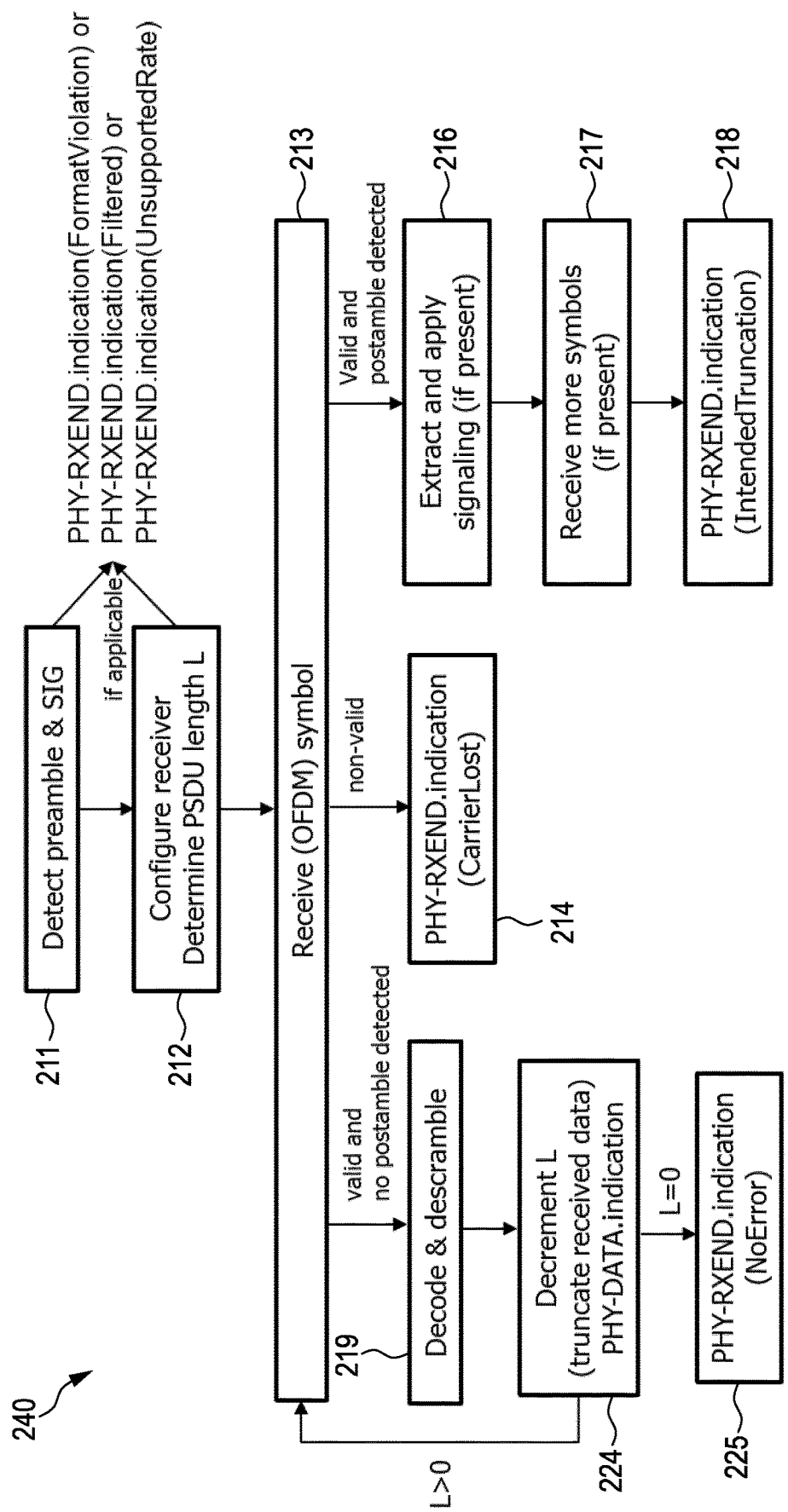
FIG. 22 shows a schematic diagram (in the form of a state machine) illustrating another embodiment of a communication device on the reception side according to the present disclosure.

In case a postamble is present, once a symbol is detected as a postamble, the receiver extracts (step 216) the signaling (if present), receives (step 217) more symbols (if present) and indicates (step 218) to the MAC that PPDU truncation is intentional. A schematic diagram (in the form of a state machine) of such an embodiment of a communication device 240 is separately shown in FIG. 22. A simplified schematic diagram of this communication device 240 comprising demodulation circuitry 231, decoding circuitry 232, (optional) post-padding removal circuitry 233 and (optional) pre-padding removal circuitry 234 is shown in FIG. 25.

In case the postamble signaling indicates the padding size, it may truncate the padding part of the last received data. This means that this branch has an impact on the "valid and no postamble detected" branch of the previously received symbol. This is feasible, because of the delay inherent in the processing of the state machine, i.e. the assumption is that the "decode & descramble" processing takes longer than the reception of the postamble.

Figure 23:
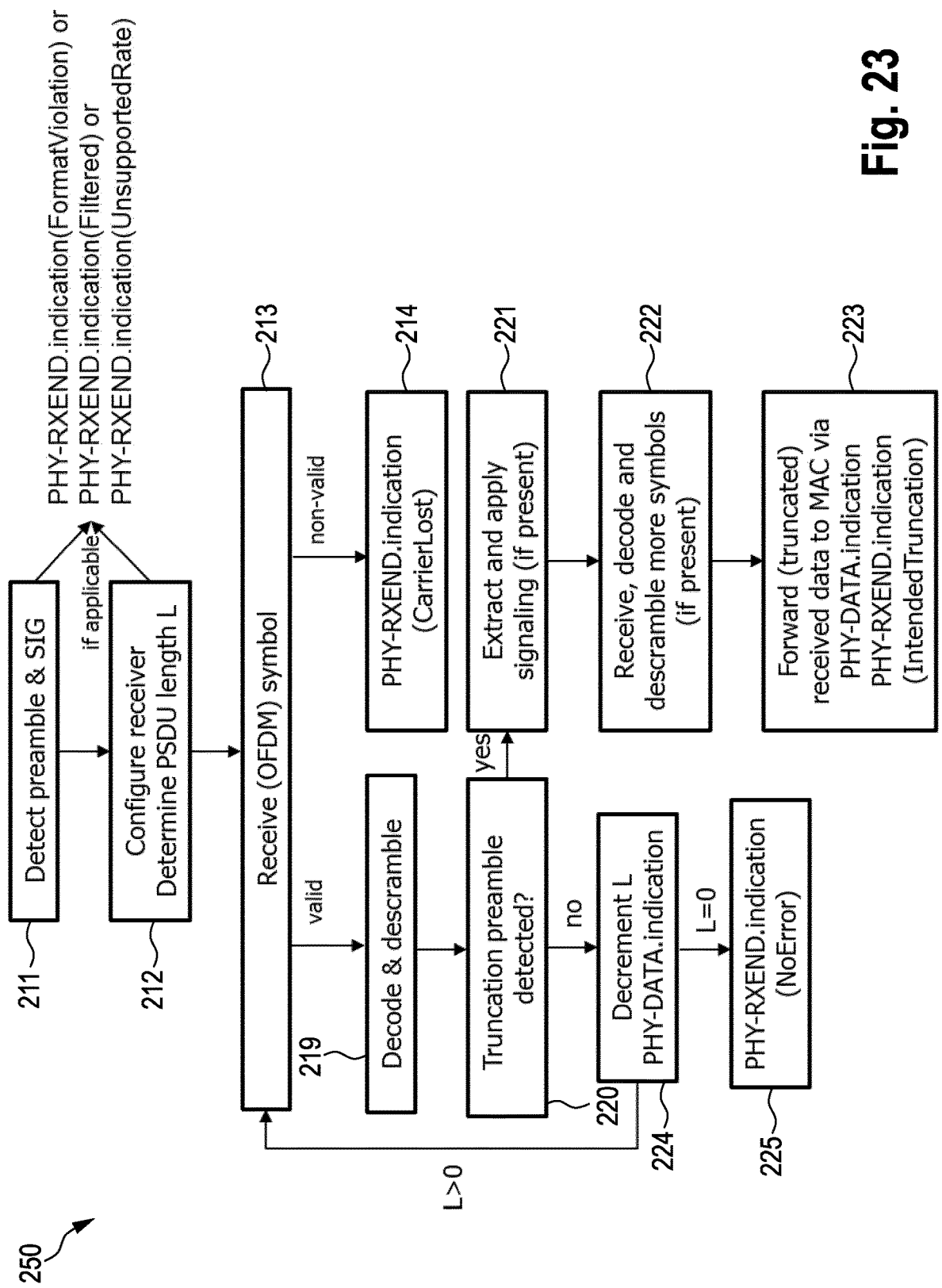
FIG. 23 shows a schematic diagram (in the form of a state machine) illustrating another embodiment of a communication device on the reception side according to the present disclosure.
Figure 26:
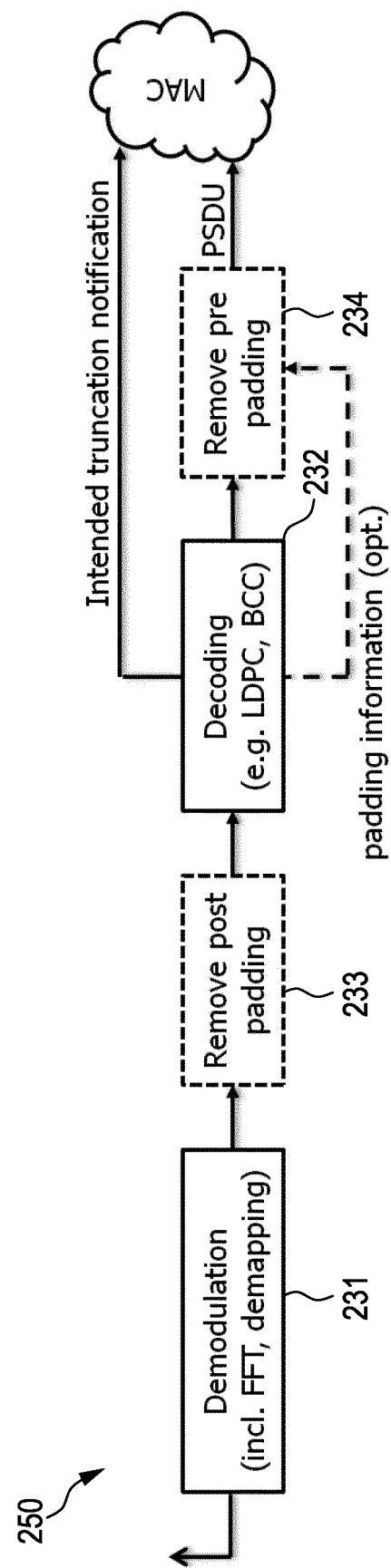

In case a preamble is present, once, after descrambling (step 219), a preamble is detected (step 220) within the data stream, the receiver extracts (step 221) that preamble and applies related signaling. The signaling may reside in several OFDM symbols, which would be received (step 222) until the end. As a last step (step 223), the receiver forwards the last data part, which may be truncated according to the signaling information, to the MAC and issues a RXEND primitive that indicates intentional PPDU truncation. In case no preamble is detected in step 220, steps 224 and 225 are carried out, which correspond to steps 305 and 306 shown in FIG. 19. It shall be noted that steps 219, 220, 224 and 225 (for regular reception of a PPDU) may always be present, regardless if truncation signaling is present or not. A schematic diagram (in the form of a state machine) of such an embodiment of a communication device 250 is separately shown in FIG. 23. A simplified schematic diagram of this communication device 250 comprising demodulation circuitry 231, decoding circuitry 232, (optional) post-padding removal circuitry 233 and (optional) pre-padding removal circuitry 234 is shown in FIG. 26.

Figure 27:
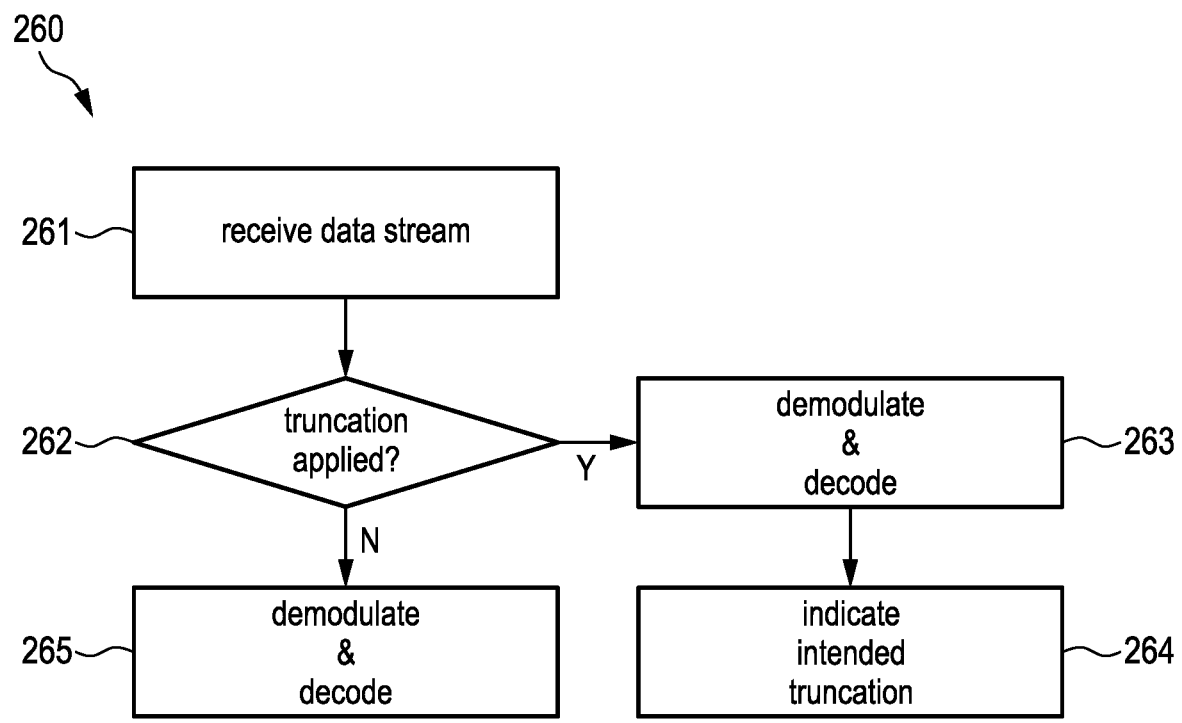
FIG. 27 shows a flow chart of a communication method on the reception side according an embodiment of the present disclosure.

FIG. 27 shows a flow chart of a communication method 260 according an embodiment of the present disclosure, which may be performed by the circuitry 201 of the communication device 200 on the reception side. In a first step 261 a receive data stream containing multiple modulation output blocks is received. It is then determined in step 262 if truncation has been applied by the other communication device (100) according to which an ongoing transmission of a data unit has been truncated. In case truncation has been applied by the other communication device, the received modulation output blocks are demodulated and decoded (step 263) and it is indicated (step 264) for subsequent processing by the communication device 200 (e.g. by the MAC layer) that an intended truncation was the reason for the truncation. In case truncation has not been applied, the received modulation output blocks are demodulated and decoded as usual (step 265)

In order to minimize data loss in MAC layer, the MAC layer may choose the point in time of truncation wisely. A MAC layer (protocol) data unit (MPDU) is the smallest unit that can be independently processed by the MAC layer. It therefore holds a MAC header and a frame check sequence (FCS) to safeguard the header and/or data content. In case more than one MPDU is transmitted in form of an aggregated MPDU (A-MPDU), the MAC layer may preferably trigger the PHY layer to stop transmission at the point in time when an MPDU of an A-MPDU ended, i.e. the recently transmitted MPDU is finalized. Since each MPDU holds a FCS, no data is lost because of the transmission truncation and can be continued later. In case of more data is provided by the MAC although it triggered the PHY to truncate transmission, the MAC may provide successive delimiters as the data to be transmitted to the PHY. These delimiters may have additional information for the receiving MAC to detect an intentional transmission truncation.

Figure 28B:
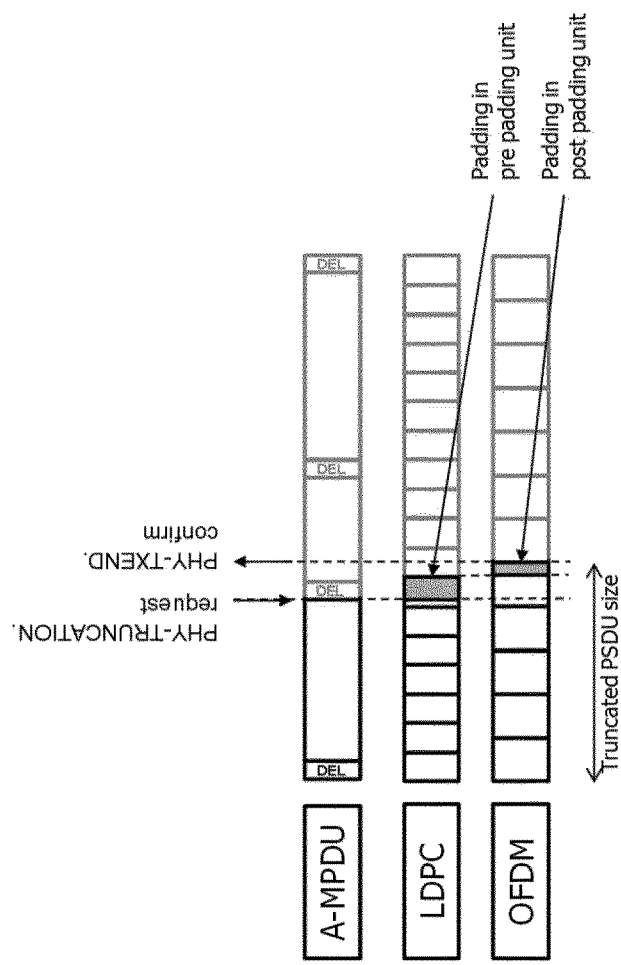
FIG. 28 shows a diagram illustrating loss-less PPDU truncation (without truncation preor postamble).
Figure 28A:
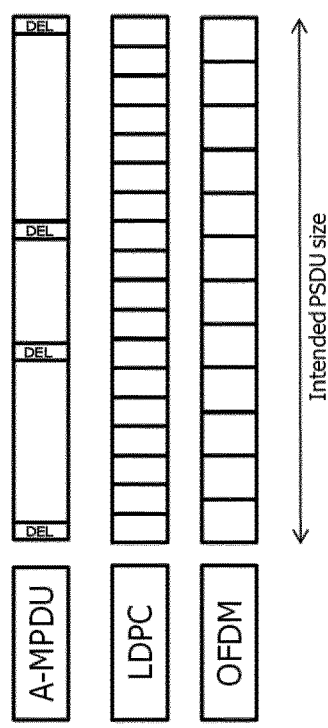
Figures 29A, 29B:
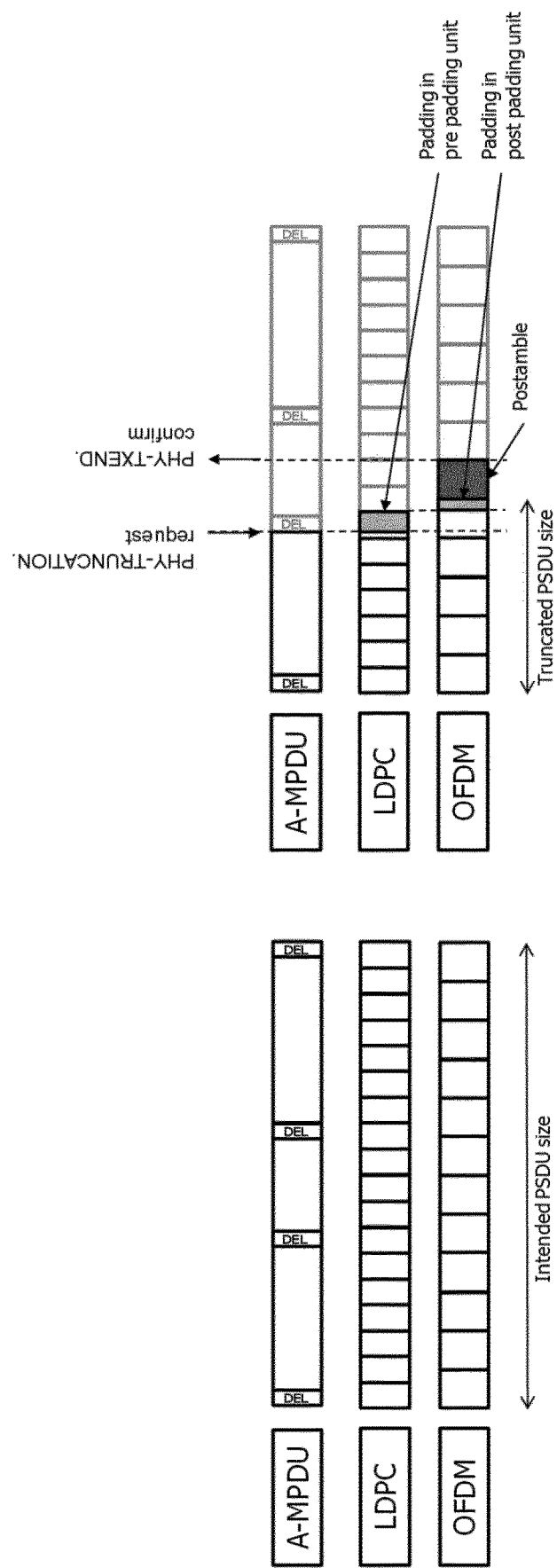
FIG. 29 shows a diagram illustrating loss-less PPDU truncation (with truncation postamble).

FIGS. 28 and 29 illustrate how minimal data loss can be achieved with the proposed PPDU truncation. FIG. 28 shows a diagram illustrating loss-less PPDU truncation (without truncation pre- or postamble). FIG. 29 shows a diagram illustrating loss-less PPDU truncation (with truncation postamble). FIGS. 28A and 29A show the non-truncated PPDU structure, whereas the truncated PPDU is shown in FIGS. 28B and 29B. It is assumed that after the first MPDU was transferred to the PHY, the MAC requests the PHY to truncate the PPDU. Following that the pre- and post-padding circuitry operates as described above in order to pad remaining data blocks. FIG. 28 assumes no further signaling, but FIG. 29 shows an example of the postamble which resides in a single OFDM symbol in the given example.

In case of multi-user PPDU (MU-PPDU), multiple MPDUs intended for different receiving STAs are multiplexed into one PPDU. In this case the padding is done similar as in the single user (SU) case, i.e. the pre-padding is done as above, whereas the post-padding is done to the longest remaining bit length. For MU-PPDU, the input block size of the modulation unit $L_M$ is same for all users u, but $R_{M,p}$ and $L_{C,e}$ are both a function of u, hence $R_{M,p}(u)$ and $L_{C,e}(u)$ holds. The number of post padding bits is given as follows $$R_M(u) = L_{M,max} - R_{M,p}(u) - L_{C,e}(u)$$

$$L_{M,max} = L_M \cdot \max_u \left\lceil \frac{R_{M,p}(u) + L_{C,e}(u)}{L_M} \right\rceil.$$

The present disclosure enables interrupting a transmission of a data unit (e.g. of a PPDU) without losing data that has already been transmitted and thus provides a receiver-friendly truncation of an ongoing PPDU transmission. Truncation of a PPDU provides gains in queuing delay for latency sensitive traffic in cases where latency sensitive (or urgent or high-priority or otherwise preferred) and non-latency sensitive traffic share the same medium.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. Communication device for transmitting data to another communication device, the communication device comprising circuitry configured to:
   obtain a truncation notification indicating that an ongoing transmission of a data unit is to be truncated;
   in response to the truncation notification,
      determine, based on the number of unprocessed modulation input bits of the data unit, a remaining bit length of a modulation input block, and
      perform padding to add a number of modulation padding bits corresponding to the determined remaining bit length of a modulation input block to the unprocessed modulation input bits to obtain a complete modulation input block;
      modulate the complete modulation input block to obtain a modulation output block; and
      transmit a transmit data stream containing the obtained modulation output block.

2. Communication device as defined in embodiment 1, wherein the circuitry is further configured to
in response to the truncation notification,
determine, based on a current bit length of encoding input bits, a remaining bit length of an encoding input block, and
perform padding to add a number of encoding padding bits corresponding to the determined remaining bit length of an encoding input block to the current bit length of encoding input bits to obtain a complete encoding input block; and
encode the complete encoding input block to obtain an encoding output block for subsequent modulation.

3. Communication device as defined in embodiment 2, wherein the circuitry is configured to determine the remaining bit length of the modulation input block as integer multiple of the size of the modulation input block minus the sum of the number of unprocessed modulation input bits and the bit length of the encoding output block.

4. Communication device as defined in embodiment 2 or 3, wherein the circuitry is configured to perform block-wise encoding to encode the complete encoding input block.

5. Communication device as defined in any preceding embodiment, wherein the circuitry is configured to determine the remaining bit length of the modulation input block as once or twice the size of the modulation input block minus the number of unprocessed modulation input bits.

6. Communication device as defined in any preceding embodiment, wherein the circuitry is configured to perform continuous encoding to encode the complete modulation input block before subsequent modulation.

7. Communication device as defined in any preceding embodiment, wherein the circuitry is configured to use, as modulation padding bits and/or as encoding padding bits, zero-valued bits, bits having a known or predetermined value, bits having an arbitrary value or bits forming a known or predetermined bit sequence.

8. Communication device as defined in any preceding embodiment, wherein the circuitry is configured to generate or receive a truncation notification if a latency-sensitive data unit shall be transmitted while currently a non-latency sensitive data unit is transmitted.

9. Communication device as defined in embodiment 8, wherein the circuitry is configured to generate or receive the truncation notification after transmission of the non-latency sensitive data unit has been completed.

10. Communication device as defined in any preceding embodiment, wherein the circuitry is configured to
perform, as part of the modulation, constellation mapping and spatial mapping;
determine, based on the number of bits per symbol of a constellation diagram used for constellation mapping, a number of padding symbols; and
perform symbol padding to add a number of padding symbols to data stream after subjecting said stream to constellation mapping and before subjecting said stream to spatial mapping.

11. Communication device as defined in any preceding embodiment, wherein the circuitry is configured to signal, to the other communication device, one or more of
an indication that truncation has been applied,
the reason why truncation has been applied,
the number of modulation padding bits and/or as encoding padding bits, and
which information has been added as modulation padding bits and/or as encoding padding bits.

12. Communication device as defined in embodiment 11, wherein the circuitry is configured to add the signaling as truncation preamble or truncation postamble to a modulation output block or to insert the signaling into a modulation input block.

13. Communication device for receiving data from another communication device, the communication device comprising circuitry configured to:
receive a receive data stream containing multiple modulation output blocks;
determine if truncation has been applied by the other communication device according to which an ongoing transmission of a data unit has been truncated; and
in case truncation has been applied by the other communication device,
demodulate and decode the received modulation output blocks; and
indicate for subsequent processing by the communication device that an intended truncation was the reason for the truncation.

14. Communication device as defined in embodiment 13, wherein the circuitry is further configured to
identify a number of modulation padding bits added into a modulation output block
demodulate said modulation output blocks and discard the identified number of modulation padding bits to obtain a demodulation output block; and
process obtained demodulation output blocks to obtain transmitted data units.

15. Communication device as defined in embodiment 14, wherein the circuitry is further configured to
identify a number of encoding padding bits added into a encoding output block; and
decode the obtained demodulation output blocks and discard the identified number of encoding padding bits to obtain transmitted data units.

16. Communication device as defined in any one of embodiments 13 to 15, wherein the circuitry is further configured to determine if truncation has been applied by the other communication device based on signaling added as truncation preamble or truncation postamble to a modulation output block or inserted into a modulation output block.

17. Communication device as defined in any one of embodiments 13 to 16, wherein the circuitry is further configured to receive, as signaling from the other communication device, one or more of
an indication that truncation has been applied,
the reason why truncation has been applied,
the number of modulation padding bits and/or encoding padding bits, and
which information has been added as modulation padding bits and/or as encoding padding bits.

18. Communication device as defined in any preceding embodiment, wherein the receiving STA for the nonlatency sensitive data unit is different than the receiving STA for the latency sensitive data unit 19. Communication method for transmitting data to another communication device, the communication method comprising:
   obtaining a truncation notification indicating that an ongoing transmission of a data unit is to be truncated;
   in response to the truncation notification,
      determining, based on the number of unprocessed modulation input bits of the data unit, a remaining bit length of a modulation input block, and
      performing padding to add a number of modulation padding bits corresponding to the determined remaining bit length of a modulation input block to the unprocessed modulation input bits to obtain a complete modulation input block;
      modulating the complete modulation input block to obtain a modulation output block; and
      transmitting a transmit data stream containing the obtained modulation output block.

20. Communication method for receiving data from another communication device, the communication method comprising:
   receiving a receive data stream containing multiple modulation output blocks;
   determining if truncation has been applied by the other communication device according to which an ongoing transmission of a data unit has been truncated;
   in case truncation has been applied by the other communication device,
      demodulating and decoding the received modulation output blocks, and
      indicating for subsequent processing by the communication device that an intended truncation was the reason for the truncation.

21. A non-transitory computer-readable recording medium that stores therein a computer program product, which, when executed by a processor, causes the method according to embodiment 19 or 20 to be performed.

22. A computer program comprising program code means for causing a computer to perform the steps of said method according to embodiment 19 or 20 when said computer program is carried out on a computer.

The invention claimed is:

1. A communication device for transmitting data to another communication device, the communication device comprising:
   circuitry configured to:
      obtain a truncation notification indicating that an ongoing transmission of a data unit is to be truncated;
      perform a truncation in response to the truncation notification indicating that the ongoing transmission of the data unit is to be truncated, the truncation including:
         determining, based on a number of unprocessed modulation input bits of the data unit, a remaining bit length of a modulation input block, and
         performing padding to add a number of modulation padding bits corresponding to the remaining bit length of the modulation input block to the unprocessed modulation input bits to obtain a complete modulation input block;
      modulate the complete modulation input block to obtain a modulation output block; and
      transmit a transmit data stream containing the obtained modulation output block, wherein the circuitry is configured to generate or receive the truncation notification if a latency-sensitive data unit shall be transmitted while currently a non-latency sensitive data unit is transmitted.

2. The communication device as claimed in claim 1, wherein the circuitry is further configured to:
   in response to the truncation notification,
      determine, based on a current bit length of encoding input bits, a remaining bit length of an encoding input block, and
      perform padding to add a number of encoding padding bits corresponding to the determined remaining bit length of the encoding input block to the current bit length of encoding input bits to obtain a complete encoding input block; and
   encode the complete encoding input block to obtain an encoding output block for subsequent modulation.

3. The communication device as claimed in claim 2, wherein the circuitry is configured to determine the remaining bit length of the modulation input block as integer multiple of the size of the modulation input block minus a sum of the number of unprocessed modulation input bits and the bit length of the encoding output block.

4. The communication device as claimed in claim 2, wherein the circuitry is configured to perform block-wise encoding to encode the complete encoding input block.

5. The communication device as claimed in claim 1, wherein the circuitry is configured to determine the remaining bit length of the modulation input block as once or twice the size of the modulation input block minus the number of unprocessed modulation input bits.

6. The communication device as claimed in claim 1, wherein the circuitry is configured to perform continuous encoding to encode the complete modulation input block before subsequent modulation.

7. The communication device as claimed in claim 1 or 2, wherein the circuitry is configured to use, as the modulation padding bits and/or as the encoding padding bits, zero-valued bits, bits having a known or predetermined value, bits having an arbitrary value or bits forming a known, or predetermined bit sequence.

8. The communication device as claimed in claim 1, wherein the circuitry is configured to generate or receive the truncation notification after transmission of the non-latency sensitive data unit has been completed.

9. The communication device as claimed in claim 1, wherein the circuitry is configured to:
   perform, as part of the modulation, constellation mapping and spatial mapping;
   determine, based on a number of bits per symbol of a constellation diagram used for constellation mapping, a number of padding symbols; and
   perform symbol padding to add the number of padding symbols to a data stream after subjecting said data stream to the constellation mapping and before subjecting said data stream to the spatial mapping.

10. The communication device as claimed in claim 1 or 2, wherein the circuitry is configured to signal, to the other communication device, one or more of:
   an indication that the truncation has been applied,
   the reason why truncation has been applied,
   the number of modulation padding bits and/or the number of encoding padding bits, and
   which information has been added as the modulation padding bits and/or as the encoding padding bits.

11. The communication device as claimed in claim 10, wherein the circuitry is configured to:

add the signaling as a truncation preamble or a truncation postamble to the modulation output block, or insert the signaling into the modulation output block.

12. A communication device for receiving data from another communication device, the communication device comprising:

circuitry configured to:
receive a data stream containing multiple modulation output blocks;
determine if truncation has been applied by the other communication device according to which an ongoing transmission of a data unit has been truncated; and
in case the truncation has been applied by the other communication device,
demodulate and decode the modulation output blocks; and
indicate for subsequent processing by the communication device that an intended truncation was the reason for the truncation,
wherein the other communication device applied the truncation when a latency-sensitive data unit was to be transmitted while a non-latency sensitive data unit was transmitted.

13. The communication device as claimed in claim 12, wherein the circuitry is further configured to:
identify a number of modulation padding bits added into a modulation output block of said modulation output blocks;
demodulate said modulation output blocks and discard the number of modulation padding bits to obtain a demodulation output block; and
process the demodulation output block to obtain transmitted data units.

14. The communication device as claimed in claim 13, wherein the circuitry is further configured to:
identify a number of encoding padding bits added into an encoding output block; and
decode the demodulation output blocks and discard the number of encoding padding bits to obtain transmitted data units.

15. The communication device as claimed in claim 12, wherein the circuitry is further configured to determine if the truncation has been applied by the other communication device based on signaling added as a truncation preamble or a truncation postamble to a modulation output block of said modulation output blocks or inserted into the modulation output block.

16. The communication device as claimed in claim 12, wherein the circuitry is further configured to receive, as signaling from the other communication device, one or more of:

an indication that the truncation has been applied,
the reason why truncation has been applied,
a number of modulation padding bits and/or a number of encoding padding bits, and
which information has been added as the modulation padding bits and/or as the encoding padding bits.

17. A communication method for transmitting data to another communication device, the communication method comprising:
obtaining a truncation notification indicating that an ongoing transmission of a data unit is to be truncated;
performing a truncation in response to the truncation notification indicating that the ongoing transmission of the data unit is to be truncated, the truncation including:
determining, based on a number of unprocessed modulation input bits of the data unit, a remaining bit length of a modulation input block, and
performing padding to add a number of modulation padding bits corresponding to the remaining bit length of the modulation input block to the unprocessed modulation input bits to obtain a complete modulation input block;
modulating the complete modulation input block to obtain a modulation output block; and
transmitting a transmit data stream containing the obtained modulation output block,
wherein the method comprises generating or receiving the truncation notification if a latency-sensitive data unit shall be transmitted while currently a non-latency sensitive data unit is transmitted.

18. A communication method for receiving data from another communication device, the communication method comprising:
receiving a data stream containing multiple modulation output blocks;
determining if truncation has been applied by the other communication device according to which an ongoing transmission of a data unit has been truncated;
in case the truncation has been applied by the other communication device,
demodulating and decoding the modulation output blocks, and
indicating for subsequent processing by the communication device that an intended truncation was the reason for the truncation,
wherein the other communication device applied the truncation when a latency-sensitive data unit was to be transmitted while a non-latency sensitive data unit was transmitted.

19. A non-transitory computer-readable recording medium that stores therein a computer program preset, which, when executed by a processor, causes the method according to claim 17 or 18 to be performed.

* * * * *